(12) United States Patent
Wang et al.

(10) Patent No.: US 12,225,347 B2
(45) Date of Patent: Feb. 11, 2025

(54) SOUND-PRODUCING DEVICE

(71) Applicant: SHENZHEN SHOKZ CO., LTD., Guangdong (CN)

(72) Inventors: Zhen Wang, Shenzhen (CN); Lei Zhang, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 157 days.

(21) Appl. No.: 18/165,346

(22) Filed: Feb. 7, 2023

(65) Prior Publication Data

US 2023/0188897 A1  Jun. 15, 2023

Related U.S. Application Data

(63) Continuation of application No. PCT/CN2021/119308, filed on Sep. 18, 2021.

(30) Foreign Application Priority Data

Dec. 29, 2020 (WO) ................. PCT/CN2020/140815

(51) Int. Cl.
*H04R 1/40* (2006.01)
*H04R 1/02* (2006.01)
(Continued)

(52) U.S. Cl.
CPC ............. *H04R 1/40* (2013.01); *H04R 1/023* (2013.01); *H04R 1/1008* (2013.01);
(Continued)

(58) Field of Classification Search
CPC ........ H04R 1/40; H04R 1/023; H04R 1/1008; H04R 1/1091; H04R 1/1075; H04R 1/227;
(Continued)

(56) References Cited

U.S. PATENT DOCUMENTS

| 6,169,811 B1 | 1/2001 | Croft, III |
| 10,397,681 B2 | 8/2019 | Silver et al. |

(Continued)

FOREIGN PATENT DOCUMENTS

| CN | 201616895 U | 10/2010 |
| CN | 203720476 U | 7/2014 |

(Continued)

OTHER PUBLICATIONS

The Extended European Search Report in European Application No. 21913245.3 mailed on May 10, 2024, 14 pages.
(Continued)

*Primary Examiner* — Tuan D Nguyen
(74) *Attorney, Agent, or Firm* — METIS IP LLC

(57) ABSTRACT

The present disclosure may provide a sound-producing device comprising a diaphragm and a housing. The housing may include a first sound guide hole and a second sound guide hole. The diaphragm may be disposed in the housing. When a user wears the sound-producing device, a distance between the first sound guide hole and the ear canal opening may be smaller than a distance between the diaphragm and the ear canal opening, a range of an included angle between a connection line between the first sound guide hole and the second sound guide hole and a connection line between the center of mass of the diaphragm and the ear canal opening may be smaller than 45°, and a distance between the second sound guide hole and the ear canal opening may be greater than the distance between the diaphragm and the ear canal opening.

20 Claims, 14 Drawing Sheets

(51) Int. Cl.
  *H04R 1/10* (2006.01)
  *H04R 1/22* (2006.01)
  *H04R 1/24* (2006.01)
  *H04R 1/28* (2006.01)
  *H04R 1/34* (2006.01)
  *H04R 7/04* (2006.01)
  *H04R 7/18* (2006.01)
  *H04R 9/02* (2006.01)
  *H04R 9/06* (2006.01)

(52) U.S. Cl.
  CPC ......... *H04R 1/1075* (2013.01); *H04R 1/1091* (2013.01); *H04R 1/227* (2013.01); *H04R 1/24* (2013.01); *H04R 1/2846* (2013.01); *H04R 1/2884* (2013.01); *H04R 1/345* (2013.01); *H04R 7/04* (2013.01); *H04R 7/18* (2013.01); *H04R 9/025* (2013.01); *H04R 9/06* (2013.01)

(58) Field of Classification Search
  CPC ...... H04R 1/24; H04R 1/2846; H04R 1/2884; H04R 1/345; H04R 7/04; H04R 7/18; H04R 9/025; H04R 9/06; H04R 1/105; H04R 1/2842; H04R 1/403; H04R 1/347; H04R 1/2849; H04R 5/0335; H04R 1/20; H04R 9/02; H04R 5/033; H04S 7/304; G02C 11/06
  See application file for complete search history.

(56) References Cited

U.S. PATENT DOCUMENTS

| | | | |
|---|---|---|---|
| 10,555,071 | B2 | 2/2020 | Wakeland et al. |
| 10,609,465 | B1 | 3/2020 | Wakeland et al. |
| 2003/0067585 | A1 | 4/2003 | Miller et al. |
| 2008/0008344 | A1 | 1/2008 | Wakabayashi et al. |
| 2013/0177194 | A1 | 7/2013 | Han et al. |
| 2015/0163583 | A1 | 6/2015 | Howes et al. |
| 2017/0201822 | A1 | 7/2017 | Shetye et al. |
| 2017/0208395 | A1 | 7/2017 | Wan et al. |
| 2018/0033419 | A1 | 2/2018 | Shetye et al. |
| 2019/0261077 | A1 | 8/2019 | Dominijanni et al. |
| 2019/0281376 | A1 | 9/2019 | Maquire et al. |
| 2020/0304905 | A1 | 9/2020 | Oishi et al. |
| 2020/0329305 | A1 | 10/2020 | Rusconi Clerici Beltrami et al. |
| 2020/0359129 | A1 | 11/2020 | Wakeland et al. |
| 2021/0067858 | A1 | 3/2021 | Struzik |
| 2022/0295167 | A1 | 9/2022 | Xu et al. |
| 2022/0326550 | A1 | 10/2022 | Xu et al. |
| 2022/0390770 | A1 | 12/2022 | Yang et al. |
| 2023/0308801 | A1 | 9/2023 | Schmidt et al. |

FOREIGN PATENT DOCUMENTS

| | | |
|---|---|---|
| CN | 207070324 U | 3/2018 |
| CN | 108718430 A | 10/2018 |
| CN | 109143580 A | 1/2019 |
| CN | 110933548 A | 3/2020 |
| JP | 2010050764 A | 3/2010 |
| WO | 2004052050 A1 | 6/2004 |

OTHER PUBLICATIONS

First Examination Report in Indian Application No. 202317011717 mailed on May 15, 2024, 6 pages.
Notice of Reasons for Rejection in Japanese Application No. 2023521777 mailed on Jun. 24, 2024, 12 pages.
International Search Report in PCT/CN2021/119308 mailed on Nov. 22, 2021, 7 pages.
Written Opinion in PCT/CN2021/119308 mailed on Nov. 22, 2021, 5 pages.
International Search Report in PCT/CN2020/140815 mailed on Apr. 29, 2021, 7 pages.
Written Opinion in PCT/CN2020/140815 mailed on Apr. 29, 2021, 5 pages.
Decision of Grant in Russian Application No. 2023104096 mailed on Jun. 29, 2023, 26 pages.
Partial Supplementary European Search Report in European Application No. 21913245.3 mailed on Feb. 1, 2024 12 pages.
Decision of Patent Grant in Korean Application No. 10-2023-7010782 mailed on Nov. 27, 2024, 3 pages.

200

300

(a)

(b)

(c)

(d)

SOUND-PRODUCING DEVICE

CROSS-REFERENCE TO RELATED APPLICATIONS

This application is a Continuation of International Patent Application No. PCT/CN2021/119308, filed on Sep. 18, 2021, which claims priority to International Patent Application No. PCT/CN2020/140815, filed on Dec. 29, 2020, the entire contents of each of which are incorporated herein by reference.

TECHNICAL FIELD

The present disclosure relates to the technical field of audio device, and in particular to a sound-producing device.

BACKGROUND

Compared with traditional in-ear earphones, an open audio device has advantages of non-blocking, safety, and comfort. Combining the open audio device with a wearable device (e.g., glasses, a Virtual Reality (VR) device), on one hand, the wearable device (e.g., glasses legs) may be used to support the audio device; on the other hand, the audio device can reduce the boringness of wearing traditional wearable devices. For example, the audio device may be combined with a wearable device used in special sport scenarios (e.g., special glasses for cycling, special glasses for running, etc.), which can greatly improve the fun of sports. Meanwhile, the open design of the audio device may also ensure the safety during sport. When the audio device is combined with the wearable device, the weight of the wearable device may be increased, and an interference (e.g., blocking an ear canal) between the audio device and the ear may also affect the user's wearing experience.

Based on the above problems, the present disclosure provides a sound-producing device with a relatively good wearing experience, a relatively good listening effect, and a relatively good sound leakage reduction effect.

SUMMARY

The embodiments of the present disclosure provide a sound-producing device. The sound-producing device may include a diaphragm and a housing. The housing may include a first sound guide hole and a second sound guide hole. The diaphragm may be disposed in the housing, and the first sound guide hole and the second sound guide hole may be respectively located on both sides of the diaphragm When a user wears the sound-producing device, a distance between the first sound guide hole and an ear canal opening of the user may be smaller than a distance between the diaphragm and the ear canal opening of the user, an included angle between a connection line between the first sound guide hole and the second sound guide hole and a connection line between the center of mass of the diaphragm and the ear canal opening of the user may be smaller than 45°, and a distance between the second sound guide hole and the ear canal opening of the user may be greater than the distance between the diaphragm and the ear canal opening of the user.

In some embodiments, the distance between the first sound guide hole and the ear canal opening of the user may be 0.5 cm-2.5 cm.

In some embodiments, the distance between the second sound guide hole and the ear canal opening of the user may be 1.5 cm-5 cm.

In some embodiments, the distance between the diaphragm and the ear canal opening of the user may be 1.5 cm-3 cm.

In some embodiments, a ratio of the distance between the diaphragm and the ear canal opening of the user to the distance between the first sound guide hole and the ear canal opening of the user may be 1.4-3.

In some embodiments, a ratio of the distance between the second sound guide hole and the ear canal opening of the user to the distance between the first sound guide hole and the ear canal opening of the user may be 1.4-5.

In some embodiments, the housing and the diaphragm may form a first acoustic cavity for radiating sound, the first acoustic cavity and the first sound guide hole may be acoustically coupled, and the first sound guide hole may be located at different side walls of the housing corresponding to the first acoustic cavity.

In some embodiments, the first sound guide hole may include a first hole part and a second hole part, the first hole part and the second hole part may be connected, and the first hole part and the second hole part may be located at different side walls of the housing corresponding to the first acoustic cavity.

In some embodiments, a length of the side wall where the first hole part is located may be greater than a length of the side wall where the second hole part is located.

In some embodiments, a ratio of a length of the second hole part to the length of the side wall where the second hole part is located may be ⅙-⅔.

In some embodiments, the length of the second hole part may be greater than or equal to ⅙ of the length of the side wall where the second hole part is located.

In some embodiments, the sound-producing device may further include a magnetic circuit structure. The magnetic circuit structure may be connected with the housing. The diaphragm may be connected with the magnetic circuit structure through a voice coil. The housing and the magnetic circuit structure may form a second acoustic cavity for radiating sound. The second acoustic cavity and the second sound guide hole may be acoustically coupled. The second sound guide hole may be located on a side wall corresponding to the second acoustic cavity.

In some embodiments, the magnetic circuit structure of the sound-producing device may include a magnetic conductive cover. The magnetic conductive cover may face away from the diaphragm. A portion of the magnetic conductive cover may be used as a side wall of the housing. The second sound guide hole may be located on the magnetic conductive cover.

In some embodiments, a ratio of a difference between an effective area of the second sound guide hole and an effective area of the first sound guide hole to the effective area of the first sound guide hole or the effective area of the second sound guide hole may be smaller than or equal to 40%.

In some embodiments, the sound-producing device may include a wearing component. The wearing component may include a connecting segment and a concave segment connected with the connecting segment. The concave segment may cause an upper edge of the wearing component to have a downward depression on the wearing component. The housing may be connected with the concave segment.

In some embodiments, the concave segment may be configured to cause the concave segment close to an ear of the user when the user wears the wearing component. The concave segment may enable the first sound guide hole to be located near the ear of the user.

In some embodiments, the concave segment may include a mounting part and a transition part connected at an angle. The housing may be arranged on the mounting part or the transition part. The transition part and the mounting part may be bent and connected with the connecting segment and extend downwards.

In some embodiments, the angle may be 15°-150°.

In some embodiments, the connecting segment may include a first connecting segment. The transition part may be connected between the mounting part and the first connecting segment, and the transition part may be bent and connected with the first connecting segment and extend downwards.

In some embodiments, the connecting segment may further include a second connecting segment. The second connecting segment may be connected to one end of the mounting part.

In some embodiments, the first sound guide hole may be disposed in at least one of an inner side of the concave segment facing the head of the user, an edge of the concave segment facing a tragus of the user, or a side surface of the concave segment facing the tragus of the user.

In some embodiments, the wearing component may include a left ear wearing part and a right ear wearing part which are respectively used to be erected on the left and right ears of the user.

DETAILED DESCRIPTION

Figure 1:
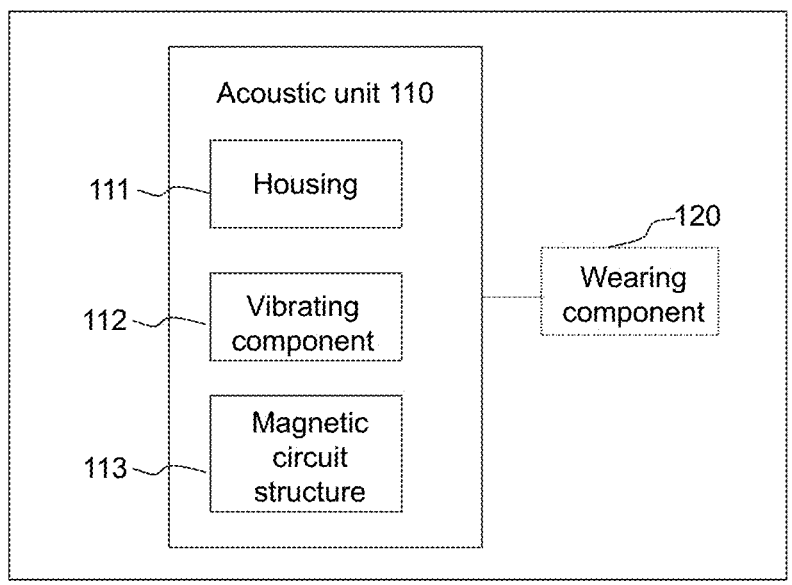
FIG. 1 is a frame diagram illustrating an exemplary sound-producing device according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of this disclosure, and those skilled in the art can also apply this disclosure to other similar scenarios according to the drawings without creative effort. Unless obviously obtained from the context or the context illustrates otherwise, the same numeral in the drawings refers to the same structure or operation.

It should be understood that "system," "device," "unit" and/or "module" used herein are one method to distinguish different components, elements, parts, sections or assembly of different level in ascending order. However, the terms may be displaced by another expression if they achieve the same purpose.

As used in the disclosure and the appended claims, the singular forms "a," "an," and "the" include plural referents unless the content clearly dictates otherwise. Generally speaking, the terms "comprise," and "include," when used in this specification, specify the presence of stated steps and elements, these steps and elements do not constitute an exclusive list, and the method or the device may also include other steps or elements.

The embodiments of the present disclosure provide a sound-producing device. In some embodiments, the sound-producing device may include a diaphragm and a housing. In some embodiments, the housing may include a first sound guide hole and a second sound guide hole. The diaphragm may be disposed in the housing, and the first sound guide hole and the second sound guide hole may be respectively located on both sides of the diaphragm. When a user wears the sound-producing device, a distance between the first sound guide hole and an ear canal opening of the user may be smaller than a distance between the diaphragm and the ear canal opening of the user, and a distance between the second sound guide hole and the ear canal opening of the user may be greater than the distance between the diaphragm and the ear canal opening of the user, so that the first sound guide hole may be closer to the ear canal opening of the user, and the second sound guide hole may be further away from the ear canal opening of the user. Sound output by the first sound guide hole and sound output by the second sound guide hole may satisfy a certain condition (e.g., a phase difference may be about 180°, to form dipole-like radiation. In a far field, the sound output by the first sound guide hole and the sound output by the second sound guide hole may be cancelled due to reverse phases, thereby reducing a sound leakage volume of the sound-producing device in the far field and preventing the sound output by the sound-producing device from being heard by people nearby. In some embodiments, an included angle between a connection line between the first sound guide hole and the second sound guide hole and a connection line between the center of mass of the diaphragm and the ear canal opening of the user may be smaller than 45°. When the user wears the sound-producing device, the included angle between the connection line between the first sound guide hole and the second sound guide hole and the connection line between the center of mass of the diaphragm and the ear canal opening of the user may be a specific angle (e.g., smaller than (45°). A direction of the dipole-like radiation formed by the sound output by the first sound guide hole and the sound output by the second sound guide hole may point to the ear canal of the user, thereby increasing an audible volume and reducing the sound leakage volume in the far field when the user wears the sound-producing device. In some embodiments, when the sound-producing device is a wearable device (e.g., glasses, a smart helmet, etc.) with an audio function, on one hand, acoustic units of the sound-producing device may not interfere with the ear of the user (e.g., blocking the ear canal), thereby improving the user's experience when wearing the sound-producing device; on the other hand, acoustic performance may be ensured and sound leakage may be reduced by setting the first sound guide hole and the second sound guide hole.

FIG. 1 is a frame diagram illustrating an exemplary sound-producing device according to some embodiments of the present disclosure. As shown in FIG. 1, the sound-producing device 100 may include an acoustic unit 110 and a wearing component 120.

In some embodiments, the sound-producing device 100 may include glasses, a smart bracelet, an earphone, a hearing aid, a smart helmet, a smart watch es, a smart clothing, a smart backpack, a smart accessory, or the like, or any combination thereof. For example, the sound-producing device 100 may be functional myopia glasses, presbyopic glasses, cycling glasses or sunglasses, etc., or smart glasses, such as audio glasses with an earphone function. The sound-producing device 100 may also be a head-mounted device such as a helmet, an Augmented Reality (AR) device, or a Virtual Reality (VR) device. In some embodiments, the AR device or the VR device may include a VR helmet, VR glasses, an AR helmet, AR glasses, or the like, or any combination thereof. For example, the VR device or the VR device may include Google Glass, Oculus Rift, Hololens, Gear VR, etc.

The acoustic unit 110 may be configured to convert a signal containing sound information into a sound signal. In some embodiments, the sound signal may include bone conduction sound waves or air conduction sound waves. For example, the acoustic unit 110 may generate a mechanical vibration to output the sound waves (i.e., sound signal) in response to receiving the signal containing the sound information. For example, if the acoustic unit 110 is an air conduction speaker, the acoustic unit 110 may include a housing 111, a vibrating component 112, and a magnetic circuit structure 113. The vibrating component 112 and the magnetic circuit structure 113 may be accommodated in the housing 111. The vibrating component 112 and the magnetic circuit structure 113 may be connected through a voice coil (not shown in FIG. 1). The vibrating component 112 may be a diaphragm. An internal magnetic field of the magnetic circuit structure 113 may change in response to a signal containing sound (i.e., an electrical signal). The voice coil may vibrate under an action of the magnetic circuit structure 113. The vibrating component 112 (diaphragm) may vibrate in response to the vibration of the voice coil. The vibrating component 112 may drive the air inside the housing 111 to vibrate, thereby producing the sound waves. In some embodiments, the acoustic unit 110 may further include one or more sound guide holes. The sound waves produced at the vibrating component 112 may be radiated to external environment through the sound guide holes. As another example, when the acoustic unit 110 is a bone conduction speaker, the acoustic unit 110 may include the vibrating component 112 and/or a vibration-transmitting component (e.g., at least a portion of a housing of the wearing component 120 in the sound-producing device 100) connected with the vibrating component 112. The acoustic unit 110 may produce mechanical vibration accompanied by energy conversion. The acoustic unit 110 may implement a conversion of a signal containing sound information into the mechanical vibration. The mechanical vibration may be transmitted to an auditory nerve of a user through a sound-transmitting component by means of bone conduction. It should be noted that, when the acoustic unit 110 is the bone conduction speaker, the acoustic unit 110 may also produce air conduction sound waves while the mechanical vibration (i.e., bone conduction sound waves) is outputted. The above conversion process may include the coexistence and conversion of various types of energy. For example, the electrical signal (i.e., the signal containing the sound information) may be directly converted into the mechanical vibration through the vibrating component 112 of the acoustic unit 110, and the mechanical vibration may be transmitted through the vibration-transmitting component to transmit the sound waves. As another example, the sound information may be contained in an optical signal. A specific acoustic unit 110 may implement a process of converting the optical signal into the sound signal. Other types of energy that can coexist and be converted during operation of the acoustic unit 110 may include thermal energy, magnetic field energy, or the like. In some embodiments, a type of the acoustic unit 110 may include a moving coil type, an electrostatic type, a piezoelectric type, a moving iron type, a pneumatic type, an electromagnetic type, etc.

In some embodiments, the acoustic unit 110 may include one or more air conduction speakers. In some embodiments, the acoustic unit 110 may include one or more bone conduction speakers. In some embodiments, the acoustic unit 110 may include a combination of one or more bone conduction speakers and one or more air conduction speakers. In some embodiments, the acoustic unit 110 may be arranged at the wearing component 120 to transmit the produced sound to the user. In some embodiments, the acoustic unit 110 may be arranged at an end of the wearing component 120 or any other positions. For example, the acoustic unit 110 may be arranged at an end of the wearing component 120, while no acoustic unit 110 may be arranged at other positions of the wearing component 120. In some embodiments, a plurality of acoustic units 110 may be arranged at a plurality of positions of the wearing component 120. For example, at least one acoustic unit 110 may be arranged at the end of the wearing component 120 or other positions. In some embodiments, the acoustic unit 110 may be arranged on an outer surface of the wearing component 120 or inside the wearing component 120. For example, the acoustic unit 110 may be arranged near a position (e.g., a position of the wearing component 120 near the temple to the ear of the user) where the wearing component 120 is in contact with the user. As another example, the wearing component 120 may include a cavity for accommodating the acoustic unit 110. At least a portion of the acoustic unit 110 may be accommodated in the cavity. As another example, the acoustic unit 110 and the wearing component 120 may be in an integrated structure.

In some embodiments, the sound-producing device 100 may further include a visual component (not shown in FIG. 1). The visual component may be used to be erected on a certain part of the user's body, for example, eyes, hands, or other positions. The wearing component 120 may be connected with one end or both ends of the visible component for keeping the sound-producing device 100 in stable contact with the user. In some embodiments, the visual component may be a lens, a display screen, or a display screen acting as a lens. In some embodiments, the visible component may also be a lens and an auxiliary component thereof, or a display screen and an auxiliary component thereof. The auxiliary component may be a component such as a spectacle frame, a bracket, etc. In some embodiments, the visual component may also be an auxiliary component that does not include the lens or the display screen.

In some embodiments, the wearing component 120 may be a glasses leg, or a head-mounted component, etc. For example, if the wearing component 120 is the glasses leg, the sound-producing device 100 may include the visual component and two wearing components 120. The two wearing components 120 may be respectively connected to two ends of the visual component, and used to be respectively erected on the corresponding left ear and right ear. As another example, if the wearing component 120 is the head-mounted component, the head-mounted component may be adjusted to adapt to the head shape of the user. Various functional components may also be arranged on the head-mounted component, and the sound-producing device 100 may include a visual component and a wearing component 120. The two ends of the wearing component 120 may be respectively connected to the two ends of the visual component. It should be noted that the structure of the wearing component 120 may be adaptively adjusted according to the type of the sound-producing device 100 or specific application scenarios.

It should be understood that FIG. 1 is provided for illustrative purposes only and is not intended to limit the scope of the present disclosure. Those skilled in the art can make various changes and modifications under the guidance of the contents of the present disclosure. These changes and modifications may all fall within the scope of protection for the application. In some embodiments, the number of originals in the figure may be adjusted according to actual conditions. In some embodiments, one or more elements in FIG. 1 may be omitted, or one or more other elements may be added or removed. For example, the sound-producing device 100 may not include the wearing component 120, and the housing 111 may have a wearing function of the wearing component 120. In some embodiments, an element may be replaced by another element that performs a similar function. In some embodiments, an element may be split into a plurality of sub-elements, or a plurality of elements may be combined into a single element. For example, the housing 111 and the wearing component 120 may be combined into one element.

Figure 2:
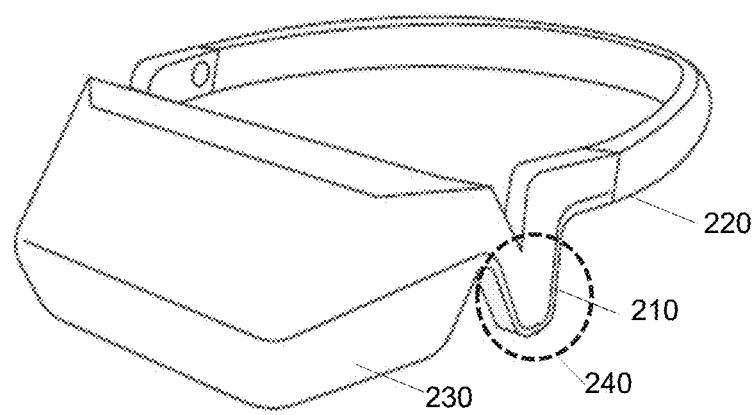
FIG. 2 is a schematic structural diagram illustrating a sound-producing device according to some embodiments of the present disclosure.

In order to further describe the sound-producing device, an exemplary description of the sound-producing device is described hereinafter. FIG. 2 is a schematic structural diagram illustrating a sound-producing device according to some embodiments of the present disclosure. The sound-producing device 200 in FIG. 2 may be a VR device or an AR device. As shown in FIG. 2, the sound-producing device 200 may include an acoustic unit 210, a wearing component 220, and a visual component 230. In some embodiments, the wearing component 220 may be a head-mounted component. The wearing component 220 may be a structure made of an elastic material or a structure with an adjustable length. Two ends of the wearing component 220 may be respectively connected with two ends of the visual component 230. When a user wears the sound-producing device 200, the wearing component 220 and the visual component 230 may surround the head of the user, and wearing of the sound-producing device 200 may be implemented through the pressure of the wearing component 220 and the visual component 230 on the head of the user. In some embodiments, the connection between the wearing component 220 and the visual component 230 may include, but not limited to, a flexible connection such as a rotational connection or a telescopic connection, or a relatively fixed connection such as a clamping connection, a screw connection, or an integral molding connection.

In some embodiments, the wearing component 220 may include a concave part 240 for placing the acoustic unit 210. When the user wears the sound-producing device 200, the concave part 240 may be located near the ear of the user (e.g., a front side, an upper side, etc.). In this way, the acoustic unit 210 may be located close to the ear of the user without blocking an ear canal opening of the user, so that the user may receive sound from an external environment while the sound produced by the acoustic unit 210 is listened by the user. In some embodiments, the acoustic unit 210 may be located on an outer surface of the concave part 240. For example, when the acoustic unit 210 is a bone conduction speaker, the acoustic unit 210 may be located on a side surface of the concave part 240 in contact with the user. As another example, when the acoustic unit 210 is an air conduction speaker, the acoustic unit 210 may be located on a side surface of the concave part 240 not in contact with the user. In some embodiments, the acoustic unit 210 may be located inside the concave part 240. For example, an accommodation cavity (not shown in FIG. 2) for accommodating the acoustic unit 210 may be arranged inside the concave part 240. The acoustic unit 210 may be located in the accommodation cavity. When the acoustic unit 210 is located in the accommodation cavity, the concave part 240 may be used as a housing of the acoustic unit 210, and other components (e.g., a magnetic circuit structure, a diaphragm, etc.) of the acoustic unit 210 may be located in the concave part 240. Taking the air conduction speaker used as the acoustic unit 210 as an example, in some embodiments, the acoustic unit 210 may include a diaphragm and a magnetic circuit structure (not shown in FIG. 2). The diaphragm and the magnetic circuit structure may be connected through a voice coil. The magnetic circuit structure may be connected with the housing (or the concave part 240) of the acoustic unit 210. A side of the diaphragm facing away from the magnetic circuit structure may form a front surface of the acoustic unit 210, and a side of the magnetic circuit structure facing away from the diaphragm may form a back surface of the acoustic unit 210. The diaphragm may vibrate to cause the acoustic unit to radiate sound outwards from the front surface and the back surface of the acoustic unit respectively. In some embodiments, the housing (or the concave part 240) of the acoustic unit 210 may include at least two sound guide holes (not shown in FIG. 2). The sound guide holes may include a first sound guide hole (also referred to as a sound outlet) and a second sound guide hole (also referred to as a pressure relief port). The first sound guide hole may be configured to output sound produced from the front surface of the acoustic unit 210, and the second sound guide hole may be configured to output sound produced from the back surface of the acoustic unit 220. A phase of the sound output from the first sound guide hole and a phase of the sound output from the second sound guide hole may be regarded as opposite, so that the sound output from the first sound guide hole and the sound output from the second sound guide hole may construct a dipole. When the user wears the sound-producing device 200, the first sound guide hole may be closer to the ear canal opening of the user, and the second sound guide hole may face away from the ear canal opening of the user, so that the acoustic unit 210 may have a relatively good acoustic output effect. In some embodiments, there may be one or more first sound guide holes and second sound guide holes. In some embodiments, the listening effect and sound leakage reduction effect of the sound-producing device 200 may be further improved by adjusting parameters such as the numbers, sizes, positions, and acoustic resistances of the first sound guide hole or the second sound guide hole. More descriptions regarding the first sound guide hole, the second sound guide hole, and the concave part 240 may be found elsewhere in the present disclosure (e.g., FIGS. 4-11 and the descriptions thereof).

Figure 3:
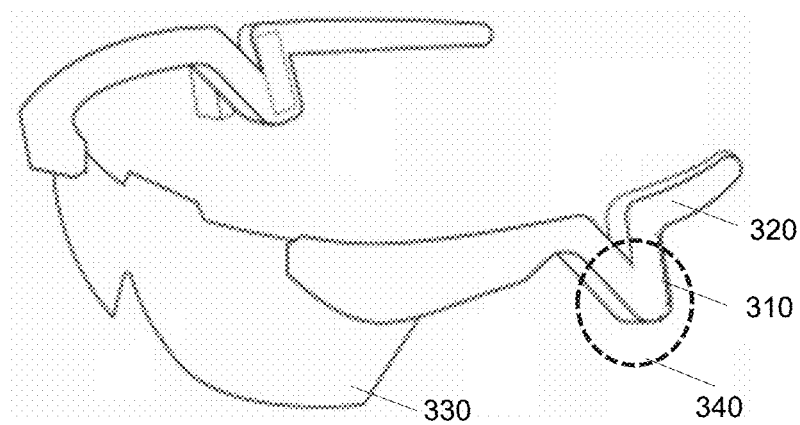
FIG. 3 is a schematic structural diagram illustrating another sound-producing device according to some embodiments of the present disclosure.

FIG. 3 is a schematic structural diagram illustrating another sound-producing device according to some embodiments of the present disclosure. A sound-producing device 300 in FIG. 3 may be glasses. As shown in FIG. 3, the sound-producing device 300 may include an acoustic unit 310, a wearing component 320, and a visual component 330 (i.e., a spectacle frame or a lens). In some embodiments, the wearing component 320 may include two glasses leg structures. One end of the wearing component 320 may be connected with an end of the visual component 330. The two glasses leg structures may be matched with the left ear and the right ear of the user respectively. When the user wears the sound-producing device 300, wearing of the sound-producing device 200 may be implemented by supporting the wearing component 320 through the ears of the user and supporting the visual component 230 through the nose bridge of the user. In some embodiments, the connection between the wearing component 320 and the visual component 330 may include, but not limited to, a flexible connection such as a rotational connection or a telescopic connection, or a relatively fixed connection such as a clamping connection, a screw connection, or an integral molding connection. The structure of the acoustic unit 310 may be similar to that of the acoustic unit 210 in FIG. 2, and the structure of a concave part 340 may be similar to that of the concave part 240 in FIG. 2, which are not repeated herein.

It should be noted that the above descriptions about the sound-producing device 200 and the sound-producing device 300 are provided for illustrative purposes only and are not intended to limit the scope of the present disclosure. Those skilled in the art can make various changes and modifications to the sound-producing device 200 and the sound-producing device 300 under the guidance of the contents of the present disclosure. However, such modifications and changes still fall within the scope of the present specification. For example, the wearing component 220 of the sound-producing device 200 may be a glasses leg structure, and the wearing component 320 of the sound-producing device 300 may be a head-mounted component.

Figure 4:
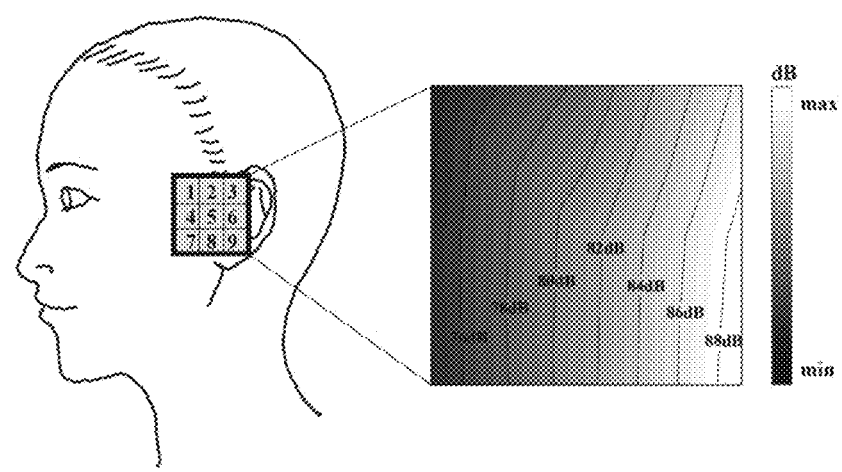
FIG. 4 is a diagram illustrating a sound pressure level of an acoustic unit at different positions according to some embodiments of the present disclosure.

When the user wears the sound-producing device, in order to prevent the acoustic unit (e.g., the acoustic unit 210, the acoustic unit 310) from interfering with the ear of the user, and do not affect the user to receive the sound of the external environment except the sound produced by the acoustic unit, the acoustic unit may be located near the ear of the user or at least a portion of the acoustic unit may be located within a projection area of the ear of the user on the face. FIG. 4 is a diagram illustrating a sound pressure level of an acoustic unit at different positions according to some embodiments of the present disclosure, which may indicate a degree of influence of sound wave obtained in an actual test (i.e., sound output from the first sound guide hole of the acoustic unit) on an audible volume at different positions in front of the ear. As shown in FIG. 4, as an illustrative example, a distribution position of the first sound guide hole of the acoustic unit on a front side of an auricle of the user may be an area 1, an area 2, an area 3, an area 4, an area 5, an area 6, an area 7, an area 8, or an area 9. The lighter the grayscale image in the right part of FIG. 4 is, the greater the sound pressure level heard by the human ear is when the first sound guide hole is located near this area. For example, when the first sound guide hole of the acoustic unit is located in the area 9, the audible volume may be approximately 88 dB. As another example, when the first sound guide hole of the acoustic unit is located in the area 6, the audible volume may be approximately 86 dB. As still another example, when the first sound guide hole of the acoustic unit is located in the area 7, the audible volume may be approximately 76 dB. It can be seen from FIG. 4 that when the first sound guide hole of the acoustic unit is placed near the area 3, the area 5, the area 6, the area 8, or the area 9, the audible volume may be relatively high. Preferably, when the first sound guide hole of the acoustic unit is placed near the area 5, the area 6, the area 8, or the area 9, it may ensure that the listener may bear a relatively high volume. Further preferably, when the first sound guide hole of the acoustic unit is placed near the area 6 or the area 9, it may ensure that the listener may bear a relatively high volume. In some embodiments, in order to ensure that the user may bear a relatively high volume when wearing the sound-producing device, the first sound guide hole (referring to FIG. 7(*a*)) may be as close as possible to the ear canal opening of the user. However, in order to ensure the opening of the ear canal opening, the first sound guide hole may keep a certain distance from the ear canal opening. A distance between the first sound guide hole and the ear canal opening of the user may refer to a distance between a center of the first sound guide hole and a center of the ear canal opening of the user, or a distance between the center of the first sound guide hole and a plane where the ear canal opening of the user is located. In some embodiments, the distance between the first sound guide hole and the ear canal opening of the user may be smaller than 4 cm. In some embodiments, the distance between the first sound guide hole and the ear canal opening of the user may be smaller than 3 cm. In some embodiments, the distance between the first sound guide hole and the ear canal opening of the user may be within a range of 0.5 cm-2.5 cm. In some embodiments, the distance between the first sound guide hole and the ear canal opening of the user may be within a range of 1 cm-2 cm. The sound produced by the diaphragm of the acoustic unit may be transmitted to the ear canal opening of the user through an acoustic structure (e.g., an acoustic cavity, a sound guide tube, a sound guide hole, etc.). In some embodiments, the listening effect of the sound-producing device may be improved by adjusting a distance between a center of mass of the diaphragm and the ear canal opening of the user. The center of mass of the diaphragm may refer to a mass center of the diaphragm. For example, the diaphragm may have a circular structure, and the center of mass of the diaphragm may be a center of the circular diaphragm. As another example, the diaphragm may have a rectangular structure, and the center of mass of the diaphragm may be a geometric center of the rectangle. The ear canal opening may refer to an opening of an external auditory canal of the human body. The distance between the diaphragm and the ear canal opening of the user may refer to a distance between the center of mass of the diaphragm and the center of the ear canal opening of the user. In other embodiments, the distance between the diaphragm and the ear canal opening of the user may also refer to a distance between the center of mass of the diaphragm and a plane where the ear canal opening of the user is located. In some embodiments, the distance between the center of mass of the diaphragm and the ear canal opening of the user may be smaller than 5 cm. In some embodiments, the distance between the center of mass of the diaphragm and the ear canal opening of the user may be smaller than 4 cm. In some embodiments, the distance between the center of mass of the diaphragm and the ear canal opening of the user may be within a range of 1 cm-4 cm. In some embodiments, the distance between the center of mass of the diaphragm and the ear canal opening of the user may be within a range of 1.5 cm-3.5 cm. In some embodiments, the distance between the center of mass of the diaphragm and the ear canal opening of the user may be within a range of 2 cm-3 cm. In some embodiments, a ratio of the distance between the center of mass of the diaphragm and the ear canal opening of the user to the distance between the first sound guide hole and the ear canal opening of the user may be greater than 1.2. In some embodiments, the ratio of the distance between the center of mass of the diaphragm and the ear canal opening of the user to the distance between the first sound guide hole and the ear canal opening of the user may be within a range of 1.2-4. In some embodiments, the ratio of the distance between the center of mass of the diaphragm and the ear canal opening of the user to the distance between the first sound guide hole and the ear canal opening of the user may be within a range of 1.4-3. In some embodiments, the ratio of the distance between the center of mass of the diaphragm and the ear canal opening of the user to the distance between the first sound guide hole and the ear canal opening of the user may be within a range of 1.5-2. In some embodiments, the ratio of the distance between the center of mass of the diaphragm and the ear canal opening of the user to the distance between the first sound guide hole and the ear canal opening of the user may be within a range of 1.6-1.8.

Figure 5:
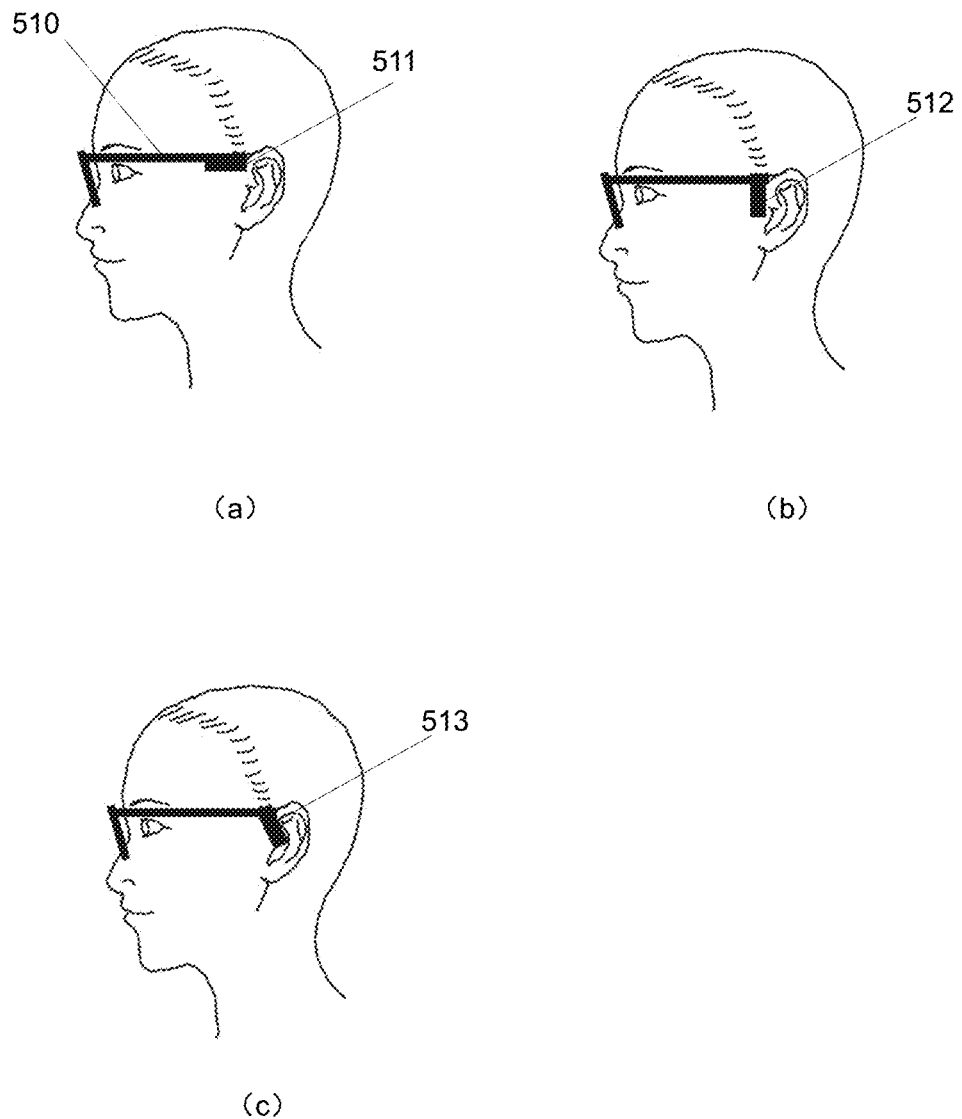
FIG. 5 is a schematic diagram illustrating the distribution of an acoustic unit at different positions according to some embodiments of the present disclosure.

Under a same sound source, different positions near the ear of the user may affect the acoustic output effect of the acoustic unit. In some embodiments, the acoustic output effect of the acoustic unit in the sound-producing device may be improved by adjusting the position of the first sound guide hole in the acoustic unit. FIG. 5 is a schematic diagram illustrating distributions of an acoustic unit at different positions according to some embodiments of the present disclosure.

As shown in FIG. 5(a), the sound-producing device may be glasses. The sound-producing device may include a wearing component 510 and an acoustic unit 511. The wearing component 510 may have a glasses leg structure. The acoustic unit 511 may have a cuboid structure. A side of the acoustic unit 511 with a larger length may be connected with the wearing component 510, and a side of the acoustic unit 511 with a smaller length may be approximately perpendicular to the wearing component 510. When the user wears the sound-producing device, the acoustic unit 511 may be located on a front side of an upper part of the auricle of the user. The side of the acoustic unit 511 with the smaller length may be directly opposite to the auricle of the user. In some embodiments, the acoustic unit 511 may include a first sound guide hole (not shown in FIG. 5(a)). The first sound guide hole may be configured to output the sound produced from a front surface of the acoustic unit 511 to external environment. The first sound guide hole may be located at a lower right corner of the acoustic unit 511, so that the first sound guide hole of the acoustic unit 511 may be close to the ear canal opening of the user. The position of the first sound guide hole may be regarded as a position near the area 2 or the area 3 in FIG. 4.

The structure of the sound-producing device in FIG. 5(b) may be substantially the same as that in FIG. 5(a). A difference between the sound-producing devices in FIG. 5(b) and FIG. 5(a) may be that a connection position of the acoustic unit 512 in the sound-producing device in FIG. 5(b) with the glasses leg structure and a connection position of the acoustic unit 511 in the sound-producing device in FIG. 5(a) with the glasses leg structure are different. As shown in FIG. 5(b), a side of the acoustic unit 512 with a smaller length may be connected with the wearing component, and a side of the acoustic unit 512 with a larger length may be approximately vertical to the wearing component. When the user wears the sound-producing device, the acoustic unit 512 may be located on the front side of the auricle of the user. The side of the acoustic unit 512 with the larger length may be directly opposite to the auricle of the user. In some embodiments, the acoustic unit 512 may include a first sound guide hole (not shown in FIG. 5(b)). The sound hole is located at the lower right corner of the acoustic unit 512, so that the first sound guide hole of the acoustic unit 512 is close to the opening of the ear canal opening of the user. Taking a height of the ear canal opening of the user as a reference plane, the position of the first sound guide hole in FIG. 5(b) may be lower than the position of the first sound guide hole in FIG. 5(a). That is to say, the position of the first sound guide hole in FIG. 5(b) may be closer to the ear canal opening of the user. The position of the first sound guide hole in FIG. 5(b) may be regarded as a position near the area 5 or the area 8 in FIG. 4.

The structure of the sound-producing device in FIG. 5(c) may be substantially the same as that in FIG. 5(b). A difference between the sound-producing devices in FIG. 5(b) and FIG. 5(c) may be that a connection position of the acoustic unit 513 in the sound-producing device in FIG. 5(c) with the glasses leg structure and a connection position of the acoustic unit 512 in the sound-producing device in FIG. 5(b) with the glasses leg structure are different. As shown in FIG. 5(c), a side of the acoustic unit 513 with a smaller length may be connected with the wearing component, and a side of the acoustic unit 513 with a large length may be connected with the wearing component at an angle (e.g., smaller than 90°), so that the first sound guide hole of the acoustic unit 513 may be closer to the ear canal opening of the user. When the user wears the sound-generating device, the acoustic unit 513 may be arranged on the front side of the auricle. The side of the acoustic unit 513 with the larger length may be inclined toward the ear canal opening of the user, so that the first sound guide hole of the acoustic unit 513 may be closer to the ear canal opening of the user. Here, the position of the first sound guide hole in FIG. 5(c) may be regarded as a position near the area 6 or the area 9 in FIG. 4.

Figure 6:
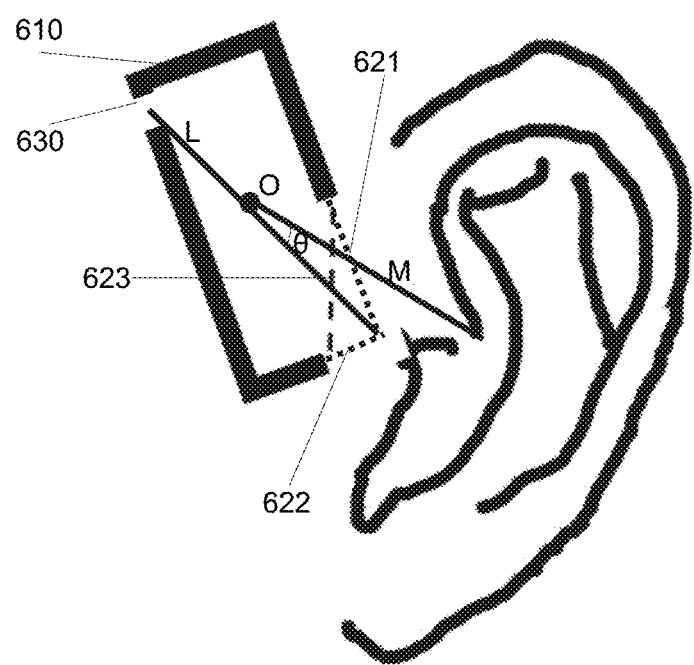
FIG. 6 is a schematic structural diagram illustrating acoustic units according to some embodiments of the present disclosure.

FIG. 6 is a schematic structural diagram illustrating an acoustic unit according to some embodiments of the present disclosure. As shown in FIG. 6, the acoustic unit may include a housing 610 configured to carry a diaphragm and a magnetic circuit structure (both not shown in FIG. 6) of the acoustic unit. The diaphragm and the magnetic circuit structure may be connected through a voice coil. The magnetic circuit structure may be connected with the housing 610. A side of the diaphragm facing away from the magnetic circuit structure may form a front surface of the acoustic unit, and a side of the magnetic circuit structure facing away from the diaphragm may form a back surface of the acoustic unit. The diaphragm may vibrate to cause the acoustic unit to radiate sound outwards from the front surface and the back surface of the acoustic unit respectively. In some embodiments, the housing 610 and the diaphragm may form a first acoustic cavity for radiating sound. The first acoustic cavity and the first sound guide hole may be acoustically coupled. The first sound guide hole may be located at different side walls of the housing corresponding to the first acoustic cavity. When the user wears the sound-producing device, the first sound guide hole may be close to the ear canal opening of the user. In some embodiments, the first sound guide hole may include a first hole part 621 and a second hole part 622. The first hole part 621 and the second hole part 622 may be connected. The first hole part 621 and the second hole part 622 may be located at different side walls of the housing corresponding to the first acoustic cavity. For example, the first hole part 621 and the second hole part 622 may be located at two adjacent side walls of the housing corresponding to the first acoustic cavity. As another example, the first hole part 621 and the second hole part 622 may be located at two adjacent edges of the housing corresponding to the first acoustic cavity. In some embodiments, a length of the side wall where the first hole part 621 is located may be greater than a length of the side wall where the second hole part 622 is located. That is to say, the first hole part 621 may be located at the side wall of the housing 610 with a relatively large length, and the second hole part 622 may be located at the side wall of the housing 610 with a relatively small length. When the acoustic unit is located at a wearing component (e.g., the wearing component 510 in FIG. 5(c)), the first hole part 621 and the second hole part 622 of the first sound guide hole may be closer to the ear canal opening of the user. For example, the first hole part 621 and the second hole part 622 in FIG. 6 may be located at a lower right corner of the housing 610. When the user wears the sound-producing device, the position of the acoustic unit may be located at a front side of the auricle of the user as shown in FIG. 6. Here, the acoustic unit may be arranged obliquely. The first hole part 621 may be in contact with other parts (e.g., a tragus) of the user's ear. Then the first hole part 621 may not directly face the ear canal opening of the user, which affects the user's hearing experience. In order to improve the acoustic output effect of the acoustic unit, the first sound guide hole may be enabled to face the ear canal opening of the user by setting the second hole part 622 at another side wall adjacent to the side wall of the housing 610 where the first hole part 621 is located. For the convenience of understanding, the first hole part 621 and the second hole part 622 may be treated as an equivalent sound guide hole 623 here. The equivalent sound guide hole 623 may be regarded as a connection area formed by connecting two ends of the first hole part 621 and the second hole part 622 with the largest distance. When the acoustic unit is arranged obliquely, the equivalent sound guide hole 623 may face toward the ear canal opening of the user. In some embodiments, the acoustic unit may include at least one resonance frequency. The resonance frequency may be positively correlated with an area of the first sound guide hole 620 of the acoustic unit, i.e., the larger the area of the first sound guide hole 620 is, the higher the resonance frequency is. When the acoustic unit has a relatively high resonance frequency, a corresponding frequency response curve of the acoustic unit may be relatively flat in a frequency range smaller than the resonance frequency. In this case, the acoustic unit has a relatively good acoustic output effect in a wider frequency range. In this embodiment, the second hole part 622 may be arranged on the acoustic unit on the basis of the first hole part 621, so that the first sound guide hole may face the ear canal opening of the user, the area of the first sound guide hole may also be increased, and the resonance frequency of the acoustic unit may be increased, thereby improving the acoustic output effect of the acoustic unit.

As a main output part of the frontal sound of the acoustic unit, the first hole part 621 may have a relatively large length. The larger the length of the first hole part is, the higher the resonance frequency of the first acoustic cavity and the first sound guide hole of the acoustic unit may be, so that the better the acoustic output effect of the acoustic unit is in a wider frequency range. In some embodiments, a ratio of the length of the first hole part 621 to the length of the side wall where the first hole part 621 is located may be smaller than 0.9. In some embodiments, the ratio of the length of the first hole part 621 to the length of the side wall where the first hole part 621 is located may be within a range of 0.3-0.8. In some embodiments, the ratio of the length of the first hole part 621 to the length of the side wall where the first hole part 621 is located may be within a range of 0.4-0.8. In some embodiments, the ratio of the length of the first hole part 621 to the length of the side wall where the first hole part 621 is located may be within a range of 0.5-0.7.

In some embodiments, the length of the second hole part 622 may be greater than or equal to ⅙ of the length of the side wall where the second hole part 622 is located. In some embodiments, a ratio of the length of the second hole part 622 to the length of the side wall where the second hole part 622 is located may be within a range of 0.1-0.8. In some embodiments, the ratio of the length of the second hole part 622 to the length of the side wall where the second hole part 622 is located may be within a range of ⅙-⅔. In some embodiments, the ratio of the length of the second hole part 622 to the length of the side wall where the second hole part 622 is located may be within a range of 0.2-0.6. In some embodiments, the ratio of the length of the second hole part 622 to the length of the side wall where the second hole part 622 is located may be within a range of 0.3-0.5. In some embodiments, the first hole part 621 and the second hole part 622 may be in regular or irregular shapes such as a rectangle, a circle, a triangle, an ellipse, and a semicircle.

It should be noted that the housing 610 of the acoustic unit may not limited to the cuboid structure in FIG. 6, and may also be a cylinder, a trapezoidal structure, a triangular prism or other regular or irregular structures. In some embodiments, the length of the side wall where the first hole part 621 is located may be the same as the length of the side wall where the second hole part 622 is located, or the length of the side wall where the first hole part 621 is located may be smaller than the length of the side wall where the second hole part 622 is located.

It should be understood that the schematic diagram in FIG. 6 is provided for illustrative purposes only, and is not intended to limit the scope of the present disclosure. Those skilled in the art can make various variations and modifications under the guidance of the present disclosure. Such variations and modifications all fall within the scope of protection for the disclosure. In some embodiments, one or more features such as the shape, size, and position of the originals shown in the figure can be adjusted according to actual conditions. For example, the length of the first hole part 621 may be greater than, equal to, or smaller than that of the second hole part 622, or the cross-sectional area of the first hole part 621 may be greater than, equal to, or smaller than that of the second hole part 622.

Figure 7:
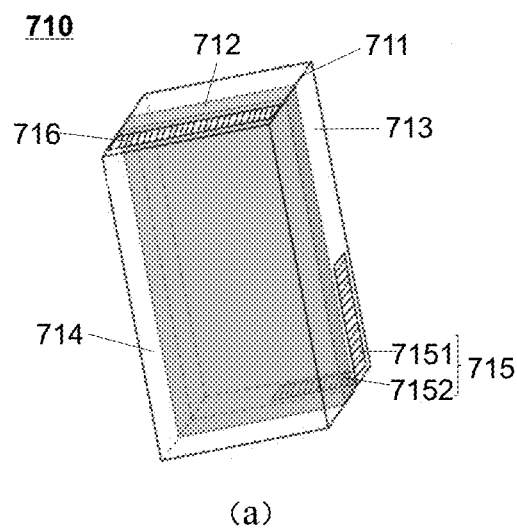
FIG. 7 is a schematic structural diagram illustrating different acoustic units according to some embodiments of the present disclosure.
Figure 7:
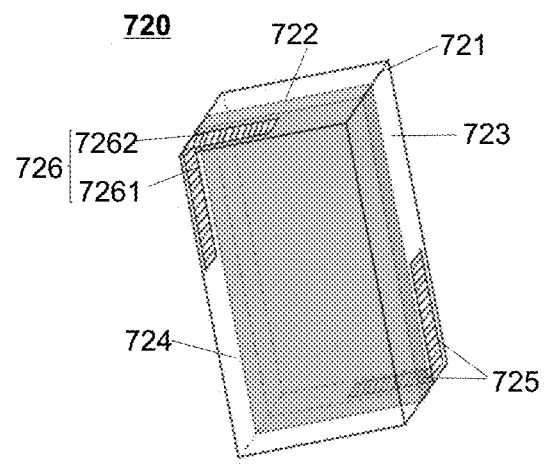
Figure 7:
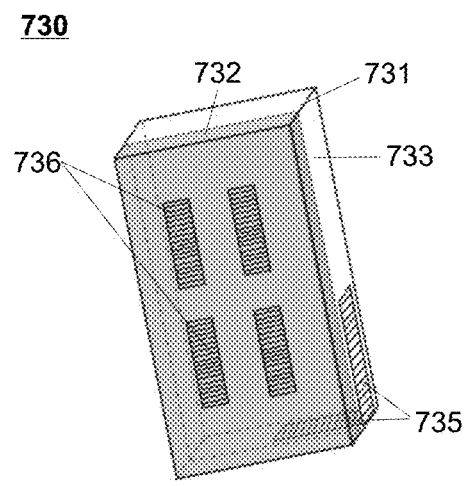
Figure 7:
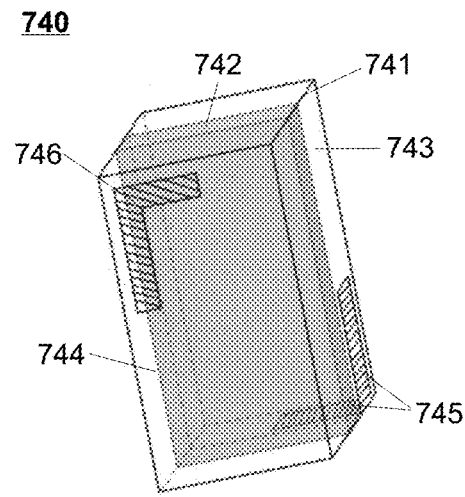

In order to further illustrate the acoustic unit, several acoustic units provided in FIG. 7 may be used as examples for description. FIG. 7 is a schematic structural diagram illustrating different acoustic units according to some embodiments of the present disclosure.

As shown in FIG. 7(a), the acoustic unit 710 may include a housing 711 and an acoustic transducer 712. In some embodiments, the housing 711 may be a hollow cuboid structure. In other embodiments, the housing 711 may also be a cylinder, a trapezoidal structure, a triangular prism and other regular or irregular structures. The acoustic transducer 712 may be configured to convert a signal containing sound information into a sound signal. In some embodiments, the acoustic transducer 712 may include a diaphragm and a magnetic circuit structure. The diaphragm and the magnetic circuit structure may be connected through a voice coil. The magnetic circuit structure may be connected with the housing 711. An internal magnetic field of the magnetic circuit structure may change in response to the signal containing the sound (i.e., the electrical signal). The voice coil may vibrate under the action of the magnetic circuit structure. The diaphragm may vibrate in response to the vibration of the voice coil. The diaphragm may drive the air inside the housing 711 to vibrate to produce sound waves. In some embodiments, a side of the diaphragm of the acoustic transducer 712 away from the magnetic circuit structure may be a front surface of the diaphragm, and another side of the diaphragm of the acoustic transducer 712 may be a back surface of the diaphragm. The diaphragm may vibrate to radiate sound from the front surface and the back surface of the diaphragm, respectively. In some embodiments, the housing 711 and the diaphragm may form a first acoustic cavity 713 for radiating sound, and the housing 711 and the magnetic circuit structure may form a second acoustic cavity 714 for radiating sound. In some embodiments, the acoustic unit 710 may further include a first sound guide hole 715. The first sound guide hole 715 may be configured to output the sound produced from the front surface of the diaphragm toward the ear canal opening of the user. The first sound guide hole 715 and the first acoustic cavity 713 may be acoustically coupled. Specifically, the first sound guide hole 715 may be located at a side wall of the housing 711 where the first acoustic cavity 713 is located. In some embodiments, the first sound guide hole 715 may include a first hole part 7151 and a second hole part 7152. The first hole part 7151 may be located at different side walls of the housing 711 corresponding to the first acoustic cavity 713. In some embodiments, the length of the side wall where the first hole part 7151 is located may be greater than the length of the side wall where the second hole part 7152 is located, i.e., the first hole part 7151 may be located at a side wall of the housing 711 with a larger length, and the second hole part 7152 may be located at a side wall of the housing 711 with a smaller length. When the acoustic unit 710 is located on a wearing component (e.g., the wearing component 510 in FIG. 5), the first hole part 7151 and the second hole part 7152 may be closer to the ear canal opening of the user. For example, the first hole part 7151 and the second hole part 7152 in FIG. 7(a) may be located at a lower right corner of the housing 711. When the user wears the sound-producing device, the position of the acoustic unit 710 may be located on a front side of the auricle of the user. Here, the acoustic unit 710 may be arranged obliquely. The first hole part 7151 may be in contact with other parts (e.g., the tragus) of the user's ear. In this case, the first hole part 7151 may not face the ear canal opening of the user, which affects the user's hearing experience. In order to improve the acoustic output effect of the acoustic unit 710, the first sound guide hole 715 may be enabled to better face towards the ear canal opening of the user by setting the second hole part 7152 at another side wall adjacent to the side wall of the housing 711 where the first hole part 7151 is located. More descriptions regarding the first hole part 7151 and the second hole part 7152 may be found elsewhere in the present disclosure (e.g., FIG. 6 and related descriptions thereof), which is not repeated herein.

In order to reduce the sound leakage of the acoustic unit 710, in some embodiments, the acoustic unit 710 may further include a second sound guide hole 716. The second sound guide hole 716 may be configured to transport the sound produced from the back surface of the diaphragm to the external environment. In some embodiments, the second sound guide hole 716 may be located at a side wall of the housing 711 corresponding to the second acoustic cavity 714. The second sound guide hole 716 and the second acoustic cavity 714 may be acoustically coupled. In some embodiments, the second sound guide hole 716 and the first sound guide hole 715 may be arranged oppositely. Here, the opposite arrangement may be understood as that an opening orientation of the second sound guide hole 716 and an opening orientation of the first sound guide hole 715 may be opposite or approximately opposite. For example, the first sound guide hole 715 may be located at a first side wall and a second side wall of the housing 711. The first side wall and the second side wall may be two adjacent side walls in the housing 711. The first hole part 7151 of the first sound guide hole 715 may be located at the first side wall. The second hole part 7152 of the first sound guide hole 715 may be located at the second side wall. The first hole part 7151 and the second hole part 7152 may be connected. The first hole part 7151 and the second hole part 7152 may be acoustically coupled with the first acoustic cavity 713. The second sound guide hole 716 may be located at a third side wall opposite to the second side wall. The second sound guide hole 716 and the second acoustic cavity 714 may be acoustically coupled. When the user wears the sound-producing device, the first hole part 7151 and the second hole part 7152 of the first sound guide hole 715 may face the ear canal opening of the user, and the second sound guide hole 716 may face away from the ear canal opening of the user. The sound output from the first sound guide hole 715 and the sound output from the second sound guide hole 716 may satisfy a specific condition (e.g., the phase difference may be about 180°) to form dipole-like radiation. In a far field, the sound output from the first sound guide hole 715 and the sound output from the second sound guide hole 716 may be canceled due to reverse phases, thereby reducing the sound leakage volume of the acoustic unit 710 in the far field and preventing the sound output from the acoustic unit 710 from being heard by people nearby. When the user wears the sound-producing device, a distance between the second sound guide hole 715 and the ear canal opening of the user may be too small, which may cause the sound output from the second sound guide hole 715 near the ear canal opening of the user and the sound output from the first sound guide hole 715 to be offset. In order to ensure the audible volume at the ear canal opening of the user and reduce the sound leakage volume in the far field, in some embodiments, the distance between the second sound guide hole 716 and the ear canal opening of the user may be greater than 1 cm. In addition, if the distance between the first sound guide hole 715 and the second sound guide hole 716 is too large, or if the distance between the second sound guide hole 716 and the ear canal opening is too large, the dimension of the sound-producing device may be too large, which may affect the user's wearing experience. In order to ensure the user's wearing experience, in some embodiments, the distance between the second sound guide hole 716 and the ear canal opening of the user may be smaller than 8 cm. Preferably, the distance between the second sound guide hole 716 and the ear canal opening of the user may be within a range of 1.5 cm-7 cm. Further preferably, the distance between the second sound guide hole 716 and the ear canal opening of the user may be within a range of 1.5 cm-5 cm. More preferably, the distance between the second sound guide hole 716 and the ear canal opening of the user may be within a range of 2 cm-4.5 cm. Further preferably, the distance between the second sound guide hole 716 and the ear canal opening of the user may be within a range of 2.5 cm-4 cm. When the user wears the sound-generating device, in order to ensure the audible volume at the ear canal opening of the user and the sound leakage reduction effect of the sound-generating device in the far field, a ratio of the distance between the second sound guide hole 716 and the ear canal opening of the user to the distance between the first sound guide hole 715 and the ear canal opening of the user may be increased as much as possible. In some embodiments, the ratio of the distance between the second sound guide hole 716 and the ear canal opening of the user to the distance between the first sound guide hole 715 and the ear canal opening of the user may be greater than 1.2. In some embodiments, the ratio of the distance between the second sound guide hole 716 and the ear canal opening of the user to the distance between the first sound guide hole 715 and the ear canal opening of the user may be within a range of 1.2-8. In some embodiments, the ratio of the distance between the second sound guide hole 716 and the ear canal opening of the user to the distance between the first sound guide hole 715 and the ear canal opening of the user may be within a range of 1.2-7. In some embodiments, the ratio of the distance between the second sound guide hole 716 and the ear canal opening of the user to the distance between the first sound guide hole 715 and the ear canal opening of the user may be within a range of 1.3-6. In some embodiments, the ratio of the distance between the second sound guide hole 716 and the ear canal opening of the user to the distance between the first sound guide hole 715 and the ear canal opening of the user may be within a range of 1.4-5. In some embodiments, the ratio of the distance between the second sound guide hole 716 and the ear canal opening of the user to the distance between the first sound guide hole 715 and the ear canal opening of the user may be within a range of 1.5-3. In some embodiments, the ratio of the distance between the second sound guide hole 716 and the ear canal opening of the user to the distance between the first sound guide hole 715 and the ear canal opening of the user may be within a range of 1.5-2.5.

Referring to FIG. 6, in some embodiments, a direction of the dipole-like radiation formed by the sound output from the first sound guide hole (including the first hole part 621 and the second hole part 622) and the sound output from the second sound guide hole may be enabled to point to the ear canal of the user by adjusting an included angle θ formed by a connection line L between the first sound guide hole and the second sound guide hole 630 and a connection line M between the center of mass O of the diaphragm and the ear canal opening, thereby improving the audible volume and reducing the sound leakage volume in the far field when the user wears the acoustic unit. In addition, the center of mass O of the diaphragm may be approximately regarded as the center point of the diaphragm. The process of adjusting the included angle θ may be regarded as the rotation of the acoustic unit with the center of mass O of the diaphragm as the center of rotation. The connection line M between the center of mass O of the diaphragm and the ear canal opening of the user may be approximately regarded as a straight line with a fixed position. By adjusting (e.g., reducing) the included angle θ, the first hole part 621 of the first sound guide hole may be arranged obliquely relative to the tragus of the user, and an area of the first hole part 621 facing the tragus of the user may be reduced, thereby reducing the influence of the tragus on the sound output from the first hole part 621. In addition, by adjusting the included angle θ, the second hole part 622 adjacent to the first hole part 621 may be closer to the ear canal opening of the user, thereby improving the user's audible volume. In order to reduce the influence of the tragus of the user and ensure that the audible volume at the ear canal of the user is relatively large, in some embodiments, the included angle θ formed by the connection line L between the first sound guide hole and the second sound guide hole 630 and the connection line M between the center of mass O of the diaphragm and the ear canal opening of the user may be smaller than 60°. In order to further reduce the influence of the tragus of the user and improve the audible volume at the ear canal of the user, in some embodiments, the included angle θ formed by the connection line L between the first sound guide hole and the second sound guide hole 630 and the connection line M between the center of mass O of the diaphragm and the ear canal opening of the user may be smaller than 45°. Preferably, the included angle θ formed by the connection line L between the first sound guide hole and the second sound guide hole 630 and the connection line M between the center of mass O of the diaphragm and the ear canal opening of the user may be smaller than 35°. Further preferably, the included angle θ formed by the connection line L between the first sound guide hole and the second sound guide hole 630 and the connection line M between the center of mass O of the diaphragm and the ear canal opening of the user may be smaller than 20°. More preferably, the included angle θ formed by the connection line L between the first sound guide hole and the second sound guide hole 630 and the connection line M between the center of mass O of the diaphragm and the ear canal opening of the user may be smaller than 10°. In some embodiments, the smaller the included angle θ formed by the connection line L between the first sound guide hole and the second sound guide hole 630 and the connection line M between the center of mass O of the diaphragm and the ear canal opening of the user is, the greater the distance difference between the first sound guide hole and the second sound guide hole 630 relative to the ear canal opening of the user may be. In this case, the smaller a degree of superposition and cancellation of the sound transmitted to the ear canal opening from the second sound guide hole 630 and the sound transmitted to the ear canal opening from the first sound guide hole is, the greater the volume the user may bear. In order to further improve the audible volume at the ear canal opening of the user, in some embodiments, the positions and sizes of the first hole part 621 and the second hole part 622 in the first sound guide hole may also be adjusted. More descriptions regarding the positions and sizes of the first hole part 621 and the second hole part 622 may be found elsewhere in the present disclosure (e.g., FIG. 6).

It should be noted that the connection line between the first sound guide hole and the second sound guide hole 620 may be a connection line between geometric centers of the two sound guide holes, or a connection line between a geometric center of an equivalent sound guide hole 623 corresponding to the first sound guide hole and a geometric center of an equivalent sound guide hole corresponding to the second sound guide hole 630. In addition, the diaphragm may be arranged parallel, vertical, or inclined relative to a contact surface of the acoustic unit and the user's face, and may be adaptively adjusted according to actual application scenarios. More descriptions regarding the parameters of the first sound guide hole, the center of mass of the diaphragm, and the ear canal opening may be found elsewhere in the present disclosure (e.g., FIG. 4 and related descriptions thereof).

FIG. 7(b) is a schematic structural diagram illustrating another acoustic unit according to some embodiments of the present disclosure. The structure of the acoustic unit 720 in FIG. 7(b) may be substantially the same as that of the acoustic unit 710 in FIG. 7(a). A difference between the acoustic unit 720 in FIG. 7(b) and the acoustic unit 710 in FIG. 7(a) may be that the structure and distribution of the second sound guide hole 726 of the acoustic unit 720 in FIG. 7(b) may be different from the structure and distribution of the second sound guide hole 716 of the acoustic unit 710 in in FIG. 7(a). The structures of the housing 721, the acoustic transducer 722, the first acoustic cavity 723, second acoustic cavity 724, and the first sound guide hole 725 in FIG. 7(b) may be respectively similar to the structures of the housing 711, the acoustic transducer 712, the first acoustic cavity 713, the second acoustic cavity 714, and the first sound guide hole 715 FIG. 7(a), which are not repeated herein. As shown in FIG. 7(b), the second sound guide hole 726 may include a third hole part 7261 and a second hole part 7262. The third hole part 7261 and the second hole part 7262 may be acoustically coupled with the second acoustic cavity 724 to output the sound produced from the back surface of the acoustic unit 720. In some embodiments, the third hole part 7261 and the first hole part (referring to the first hole part 7151 in FIG. 7(a)) of the first sound guide hole 725 may be arranged oppositely. A fourth hole part 7262 and the second hole part (referring to the second hole part 7152 in FIG. 7(a)) of the first sound guide hole 725 may be arranged oppositely. Specifically, the third hole part 7261 may be located on a fourth side wall opposite to the first side wall where the first hole part of the first sound guide hole 725 is located, and the fourth hole part 7262 may be located at a third side wall opposite to the second side wall where the second hole part of the first sound guide hole 725 is located. When the user wears the sound-producing device, the first hole part and the second hole part of the first sound guide hole 725 may face the ear canal opening of the user, and the third hole part 7261 and the fourth hole part 7262 of the second sound guide hole 726 may face away from the ear canal opening of the user. The sound output from the first sound guide hole 725 and the sound output from the second sound guide hole 726 may satisfy a specific condition (e.g., the phase difference may be about 180°) to form dipole-like radiation. In a far field, the sound output from the first sound guide hole 725 and the sound output from the second sound guide hole 726 may be cancelled due to reverse phases, thereby reducing the sound leakage volume of the acoustic unit 720 in the far field, and preventing the sound output from the acoustic unit 720 being heard by people nearby.

FIG. 7(c) is a schematic structural diagram illustrating another acoustic unit according to some embodiments of the present disclosure. The structure of the acoustic unit 730 in FIG. 7(c) may be substantially the same as that of the acoustic unit 710 in FIG. 7(a). A difference between the acoustic unit 730 in FIG. 7(c) and the acoustic unit 710 in FIG. 7(a) may be that the acoustic unit 730 in FIG. 7(c) may not be provided with the second acoustic cavity. The structures of the housing 731, the acoustic transducer unit 732, the first acoustic cavity 733, and the first sound guide hole 735 in FIG. 7(c) may be respectively similar to the structures of the housing 711, the acoustic transducer 712, the first acoustic cavity 713, and the first sound guide hole 715 in FIG. 7 (a), which are not repeated herein. As shown in FIG. 7(c), the acoustic unit 730 may include the housing 731 and the acoustic transducer unit 732. The magnetic circuit structure of the acoustic transducer unit 732 may include a magnetic conductive cover (not shown in FIG. 7(c)). The magnetic conductive cover may face away from the diaphragm, and a portion of the magnetic conductive cover may be used as a side wall of the housing of the acoustic unit. Here it can be understood that the magnetic conductive cover may be a side wall of the housing 731. In some embodiments, the acoustic unit 730 may include one or more second sound guide holes 736. The second sound guide holes 736 may be located on the magnetic conductive cover. In some embodiments, the shape of the second sound guide hole 736 may be a regular or irregular shape such as a circle, a semicircle, an ellipse, a triangle, a quadrangle (e.g., a rectangle), or a pentagon. In some embodiments, when there are a plurality of second sound guide holes 736, the shapes of the second sound guide holes 736 may be the same or different. When the user wears the sound-producing device, the first hole part and the second hole part of the first sound guide hole 735 may face the ear canal opening of the user, and the second sound guide hole 736 may face away from the user's face area. Here, the sound output from the first sound guide hole 735 and the sound output from the second sound guide hole 736 may be approximately vertical to the human face. The sound output from the first sound guide hole 735 and the sound output from the second sound guide hole 736 may be reflected by the human face (approximately regarded as a baffle), and the dipole may become a quadrupole, thereby producing a sound radiation directivity diagram similar to that of the dipole. More descriptions regarding the first sound guide hole 735 and the second sound guide hole 736 in the acoustic unit 730 approximately arranged oppositely may be found elsewhere in the present disclosure (e.g., FIG. 10A, FIG. 10B, FIG. 11 and related descriptions thereof).

FIG. 7(d) is a schematic structural diagram illustrating another acoustic unit according to some embodiments of the present disclosure. The structure of the acoustic unit 740 in FIG. 7(d) may be substantially the same as that of the acoustic unit 710 in FIG. 7(a). A difference between the acoustic unit 740 in FIG. 7(d) and the acoustic unit 710 in FIG. 7(a) may be that the structure and distribution of the second sound guide hole 746 of the acoustic unit 740 in FIG. 7(d) may be different from he structure and distribution of the second sound guide hole 716 of the acoustic unit 710 in FIG. 7(a). The structures of the housing 741, the acoustic transducer 742, the first acoustic cavity 743, the second acoustic cavity 744, and the first sound guide hole 745 in FIG. 7(d) may be respectively similar to the structures of the housing 711, the acoustic transducer 712, the first acoustic cavity 713, the second acoustic cavity 714, and the first sound guide hole 715 in FIG. 7(a), which are not repeated herein. As shown in FIG. 7(d), the second sound guide hole 746 may be located at a side wall of the housing 741 opposite to a magnetic conductive plate. The second sound guide hole 746 may be acoustically coupled with the second acoustic cavity 744 for outputting sound produced from the back surface of the acoustic unit 742. When the user wears the sound-producing device, the first hole part and the second hole part of the first sound guide hole 745 may face the ear canal opening of the user, and the second sound guide hole 746 may face away from the user's face area. The sound output from the first sound guide hole 745 and the sound output from the second sound guide hole 746 may be reflected by the human face (approximately regarded as a baffle), and the dipole may become a quadrupole, thereby producing a sound radiation directivity diagram similar to that of the dipole.

Figure 8:
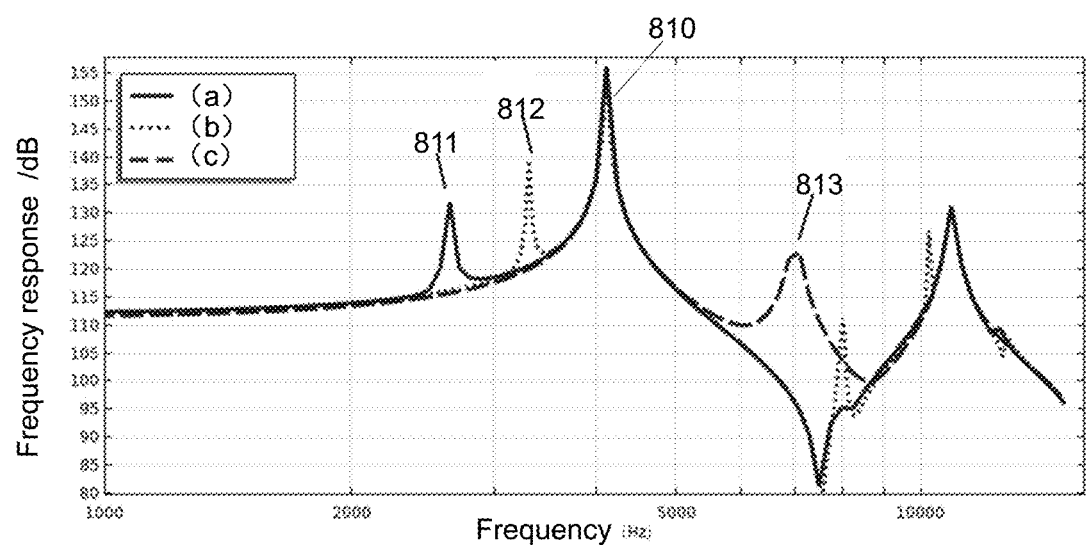
FIG. 8 is a curve diagram illustrating frequency responses of different acoustic units according to some embodiments of the present disclosure.

In order to further illustrate the acoustic output effects of different acoustic units (e.g., the acoustic unit 710, the acoustic unit 720 and the acoustic unit 730) in FIG. 7, a specific description will be given in FIG. 8. FIG. 8 illustrates frequency response curves of different acoustic units according to some embodiments of the present disclosure. In FIG. 8, a solid line (a) may be a frequency response curve of the acoustic unit 710 in FIG. 7(a), a dotted line (b) may be a frequency response curve of the acoustic unit 720 in FIG. 7(b), and a dotted line (c) may be a frequency response curve of the acoustic unit 730 in FIG. 7(c). As shown in FIG. 8, the three frequency response curves may have a resonant peak 810 near 4 kHz. The resonant peak 810 may be mainly caused by a first acoustic cavity (e.g., the first acoustic cavity 713, the first acoustic cavity 723, and the first acoustic cavity 733) and a first sound guide hole (e.g., the first sound guide hole 715, the first sound guide hole 725, and the first sound guide hole 735). As the structures of the first acoustic cavities and the first sound guide holes of the three acoustic units in FIG. 7(a), FIG. 7(b) and FIG. 7(c) are the same, the resonant peaks of the three frequency response curves near 4 kHz may coincide with each other. In the acoustic unit 710 in FIG. 7(a), due to the structures of the second acoustic cavity 714 and the second sound guide hole 716, the corresponding frequency response curve (a) may have a resonant peak 811 around 2.6 kHz. In the acoustic unit 720 in FIG. 7(b), due to the structures of the second acoustic cavity 724 and the second sound guide hole 726, the corresponding frequency response curve (b) may have a resonant peak 812 around 3.2 kHz. In the acoustic unit 730 in FIG. 7(c), as the acoustic unit 730 has only the second sound guide hole 736 and has no second acoustic cavity, a resonance frequency of a resonant peak 813 in the corresponding frequency response curve (c) may be relatively high, and the resonance frequency of the resonant peak 813 may be around 7 k Hz. It can be seen from the above that in a specific frequency band (e.g., 1000 Hz-10000 Hz), when the acoustic unit has no second acoustic cavity, the frequency response curve of the acoustic unit may be flatter and have a better acoustic output effect. In some embodiments, the resonance frequency corresponding to the resonant peak (e.g., the resonant peak 811 and the resonant peak 812) caused by the second acoustic cavity may be improved by reducing the volume of the second acoustic cavity.

In some embodiments, the first sound guide hole and the second sound guide hole may be arranged oppositely or approximately arranged oppositely. When the user wears the sound-producing device, a connection line between the center of the first sound guide hole and the center of the second sound guide hole may point to the ear canal opening of the user. On one hand, the first sound guide hole and the second sound guide hole may be arranged oppositely or approximately arranged oppositely, and the first sound guide hole may be closer to the ear canal opening of the user, which can ensure that the acoustic unit may provide the user with a relatively large audible volume. On the other hand, the second sound guide hole may face away from the ear canal opening of the user to prevent the sound output from the first sound guide hole and the sound output from the second sound guide hole from interfering at the position of the ear canal opening of the user. Meanwhile, the sound output from the first sound guide hole and the sound output from the second sound guide hole may be approximately regarded as forming a dipole and may be offset in the far field. The positional relationship between the first sound guide hole and the ear canal opening of the user, and the positional relationship between the second sound guide hole and the ear canal opening of the user will be exemplarily described below with reference to FIG. 9.

It should be noted that the foregoing one or more embodiments are for illustrative purposes only, and are not intended to limit the structure and shape of the acoustic unit. After fully understanding the principle of the acoustic unit, variations can be made to the acoustic unit to obtain an acoustic unit different from the embodiments of the present disclosure. For example, a portion of the second sound guide hole of the acoustic unit may be located at a corresponding side wall of the second acoustic cavity, and another portion of the second sound guide hole of the acoustic unit may be located at a magnetic conductive cover of a magnetic circuit structure.

Figure 9:
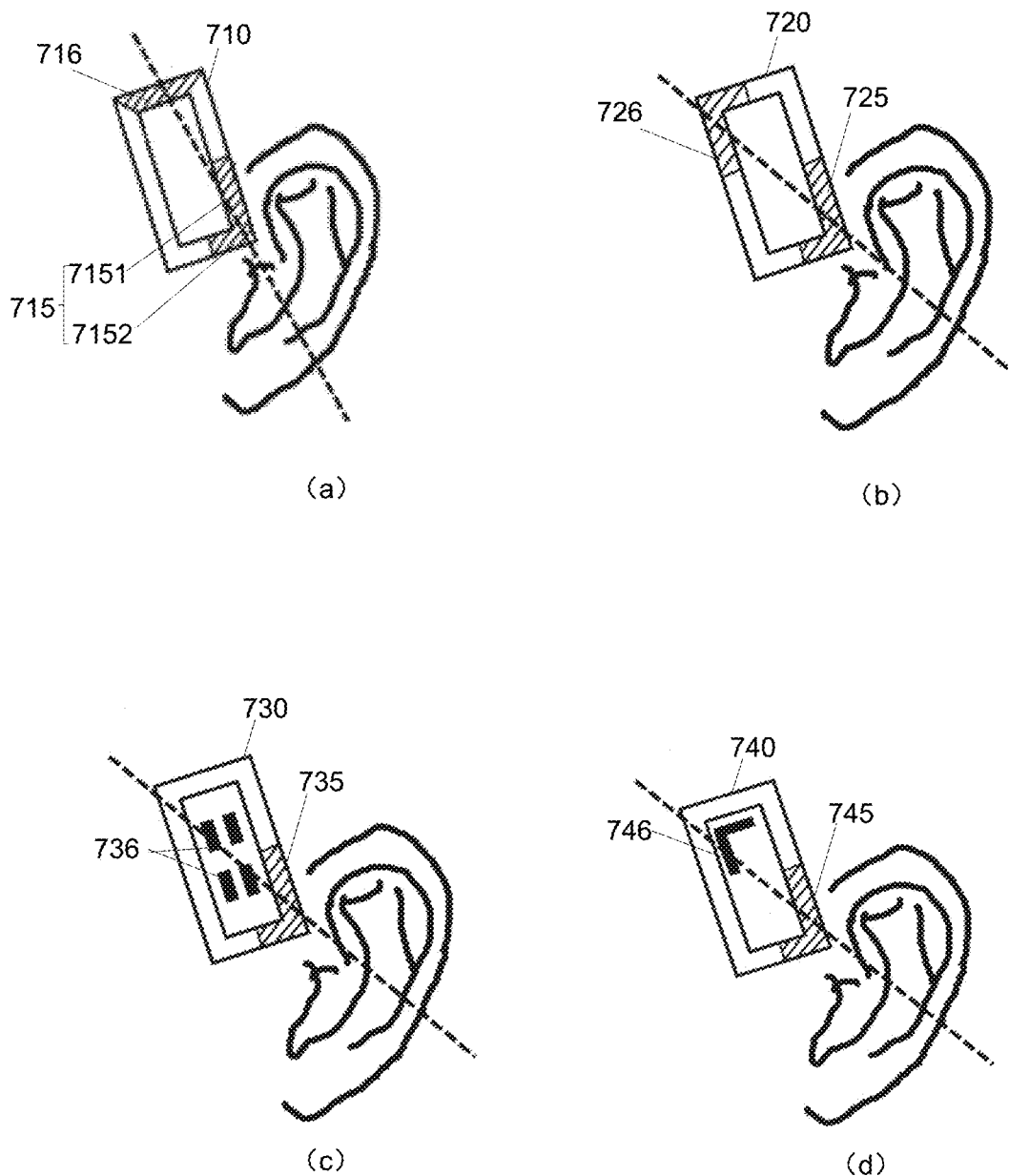
FIG. 9 illustrates distributions of different acoustic units at an ear according to some embodiments of the present disclosure.

FIG. 9 illustrates distributions of different acoustic units at an ear according to some embodiments of the present disclosure. The acoustic units in diagrams a, b, c and d in FIG. 9 may correspond to diagrams a, b, c and d in FIG. 7, respectively. As shown in FIG. 9(a), the first sound guide hole 715 may be located at a lower right corner of the acoustic unit 710, and the second sound guide hole 716 may be located at an upper left of the acoustic unit 710. When the user wears the acoustic unit 710, the first hole part 7151 and the second hole part 7152 of the first sound guide hole 715 may be close to the ear canal opening of the user, and the second sound guide hole 716 may face away from the ear canal opening of the user. A connection line between a center of the first sound guide hole 715 and a center of the second sound guide hole 716 may point to the ear canal opening of the user. Here it can be understood that the center of the first sound guide hole 715, the center of the second sound guide hole 716, and the ear canal opening of the user may be substantially on a same straight line. It should be noted that a center of a sound guide hole here may be a geometric center of the sound guide hole, or a geometric center of an equivalent sound guide hole corresponding to the sound guide hole. For example, in FIG. 9(a), the equivalent sound guide hole corresponding to the first sound guide hole 715 may be regarded as a connection area formed by connecting two ends of the first hole part 7151 and the second hole part 7152 with the largest distance. The center of the first sound guide hole 715 may be the geometric center of the equivalent sound guide hole corresponding to the first sound guide hole. The second sound guide hole 716 may have a rectangular shape, and the center of the second sound guide hole 716 may be the geometric center of the rectangle. As another example, in FIG. 9(*b*), the center of the first sound guide hole 725 may be the geometric center of the equivalent sound guide hole corresponding to the first sound guide hole. The second sound guide hole 726 may include a third hole part and a fourth hole part. The equivalent sound guide hole corresponding to the second sound guide hole 726 may be regarded as a connection area formed by connecting two ends of the third hole part and the fourth hole part with the largest distance. The center of the second sound guide hole 726 may be the center of the equivalent sound guide hole corresponding to the second sound guide hole. As another example, in FIG. 9(*c*), the center of the first sound guide hole 735 may be the center of the equivalent sound guide hole corresponding to the first sound guide hole. The second sound guide hole 736 may include a plurality of sub-sound guide holes, and the center of the second sound guide hole 736 may be a geometric center of the plurality of sub-sound guide holes. As another example, in FIG. 9(*d*), the center of the first sound guide hole 745 may be the center of the equivalent sound guide hole corresponding to the first sound guide hole. The center of the second sound guide hole 746 may be a geometric center of the second sound guide hole 746.

Figure 10A:
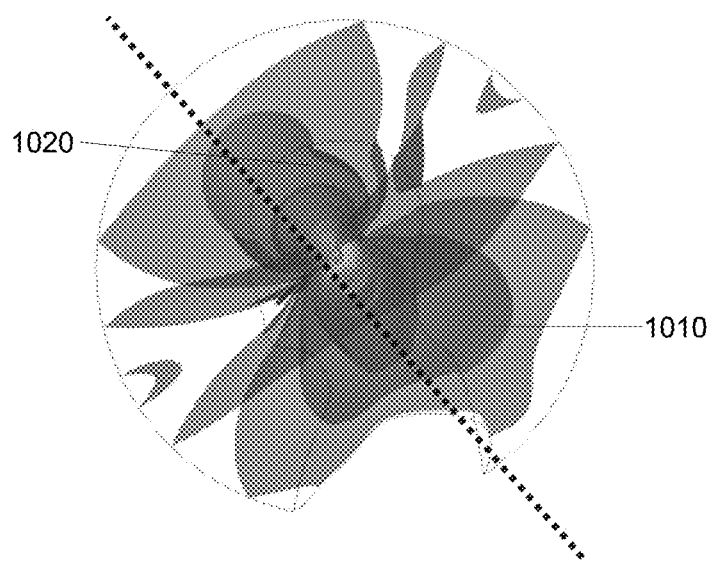
FIG. 10A is a radiation directivity diagram of an acoustic unit according to some embodiments of the present disclosure.

FIG. 10A is a radiation directivity diagram of the acoustic unit when the first sound guide hole and the second sound guide hole of the acoustic unit in FIG. 7(*b*) are arranged oppositely according to some embodiments of the present disclosure. As shown in FIG. 10A, the radiation directivity diagram may be approximately a shape of "8", where a main lobe direction of the shape of 8 may correspond to the direction of the connection line in FIG. 9(*b*) (see the dotted line in FIG. 10A). The darker the color is, the higher the sound pressure level may be. When the user wears the sound-producing device, the human ear may be in a main lobe area (e.g., a main lobe area 1010, or a main lobe area 1020) of the shape of 8. The sound pressure level of the sound heard by the ear of the user may be the highest, while the sound pressure level of the sound vertical to the main lobe direction may be relatively small. A space vertical to the main lobe direction may face an external space, which may effectively reduce the sound leakage in the space and ensure a certain degree of privacy.

Figure 10B:
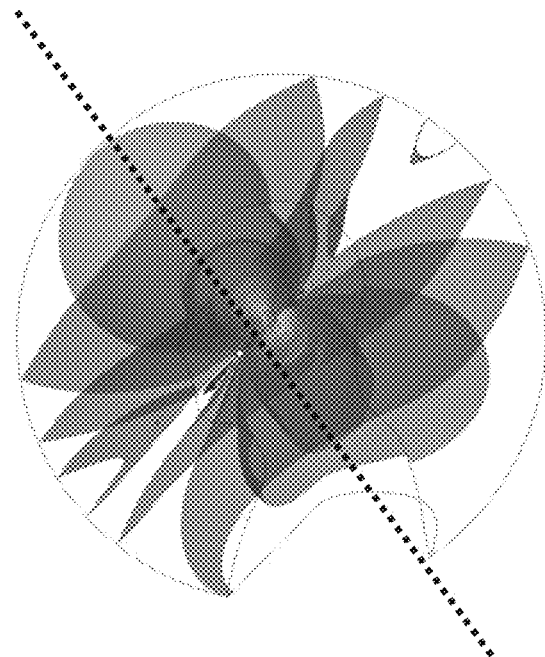
FIG. 10B is a radiation directivity diagram of an acoustic unit according to some embodiments of the present disclosure.

FIG. 10B is a radiation directivity diagram of the acoustic unit without the second acoustic cavity in FIG. 7(*c*). The radiation directivity diagram in FIG. 10B may be substantially the same as the radiation directivity diagram in FIG. 10A. It can be seen that the first sound guide hole 735 and the second sound guide hole 736 in FIG. 7(*c*) may not be arranged oppositely in terms of structure. However, due to the existence of a boundary condition (e.g., human face), the sound output from the first sound guide hole 735 and the sound output from the second sound guide hole 736 may be acoustically considered to be approximately opposite.

Figure 11:
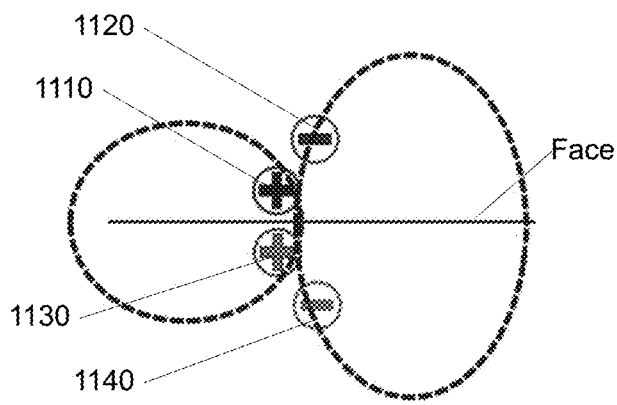
FIG. 11 is a schematic diagram illustrating the principle of reflection of a dipole by a face according to some embodiments of the present disclosure.

In order to facilitate the understanding of the boundary condition, it is described in conjunction with FIG. 11. FIG. 11 is a schematic diagram illustrating the principle of reflection of a dipole by a face according to some embodiments of the present disclosure. As shown in FIG. 11, when the user wears the sound-producing device, the first sound guide hole of the acoustic unit may face the ear canal opening of the user, and the second sound guide hole may face away from the user's face. The sound output from the first sound guide hole may be a sound wave 1110, and the sound output from the second sound guide hole may be a sound wave 1120. The sound wave 1110 and the sound wave 1120 may form dipole-like radiation. The sound radiated to the external environment from the sound wave 1110 and the sound wave 1120 may be approximately vertical to the human face. The sound wave 1110 and the sound wave 1120 may be reflected by the user's face to form a sound wave 1130 and a sound wave 1140 symmetrical to the sound waves 1110 and the sound waves 1120. A dipole formed by the sound wave 1110 and the sound wave 1120 may become a quadrupole, thereby producing a sound radiation directivity diagram similar to that of the dipole.

In order to ensure that the acoustic radiation at the first sound guide hole and the acoustic radiation at the second sound guide hole are substantially the same to form the above-mentioned dipole with the shape of 8, in some embodiments, a ratio of a difference between an effective area of the second sound guide hole and an effective area of the first sound guide hole to the effective area of the first sound guide hole or the effective area of the second sound guide hole may be smaller than or equal to 40%. In some embodiments, the ratio of the difference between the effective area of the second sound guide hole and the effective area of the first sound guide hole to the effective area of the first sound guide hole or the effective area of the second sound guide hole may be smaller than or equal to 30%. In some embodiments, the ratio of the difference between the effective area of the second sound guide hole and the effective area of the first sound guide hole to the effective area of the first sound guide hole or the effective area of the second sound guide hole may be smaller than or equal to 20%. In some embodiments, the ratio of the difference between the effective area of the second sound guide hole and the effective area of the first sound guide hole to the effective area of the first sound guide hole or the effective area of the second sound guide hole may be smaller than or equal to 20%. In some embodiments, the effective area of the second sound guide hole and the effective area of the first sound guide hole may be equal. As used herein, an effective area of a sound guide hole may be referred to as a product of an actual area of the sound guide hole and a porosity of an acoustic resistance net covered on the sound guide hole, i.e., an area through which air can pass through the opening. For example, when an outlet end of the sound guide hole is covered by the acoustic resistance net, the effective area of the sound guide hole may be the product of the actual area of the sound guide hole and the porosity of the covered acoustic resistance net. As another example, when an outlet end of a pressure relief hole is not covered with the acoustic resistance net, the effective area of the sound guide hole may be the actual area of the sound guide hole.

Figure 12:
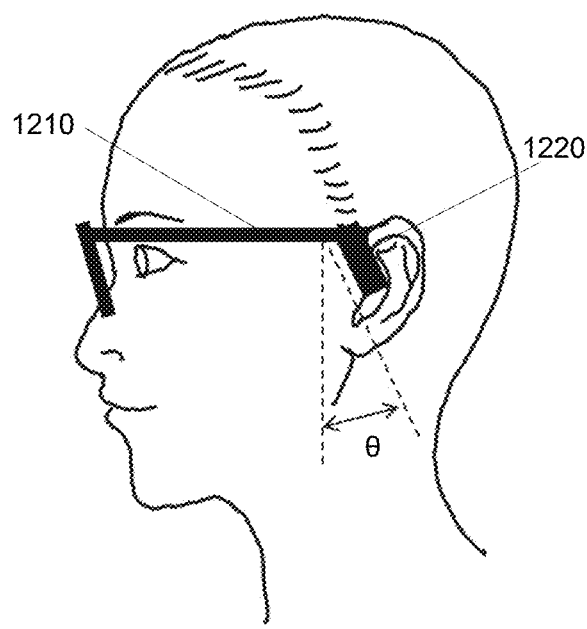
FIG. 12 is a schematic structural diagram illustrating a sound-producing device according to some embodiments of the present disclosure.
Figure 13:
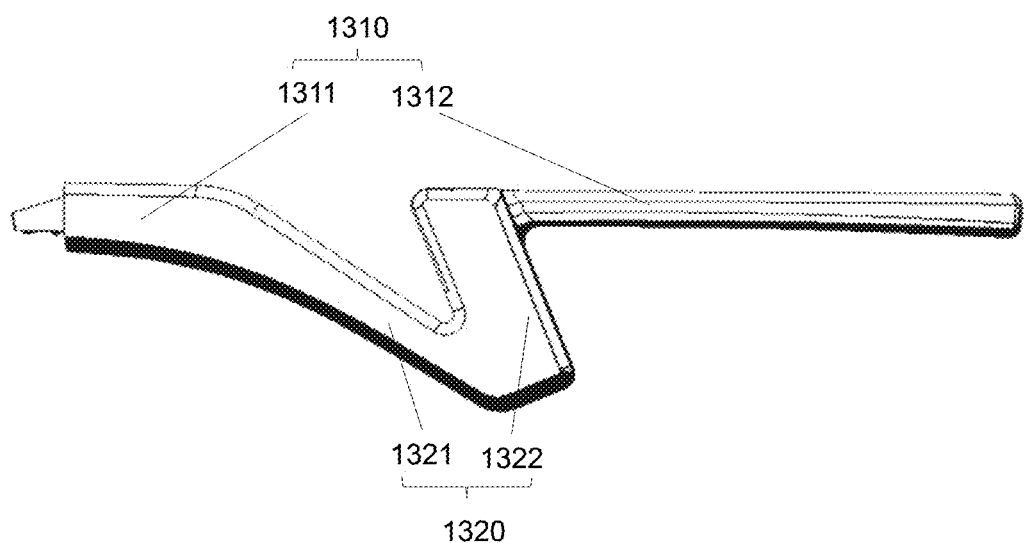
FIG. 13 is a schematic structural diagram illustrating a wearing component according to some embodiments of the present disclosure.
Figure 14A:
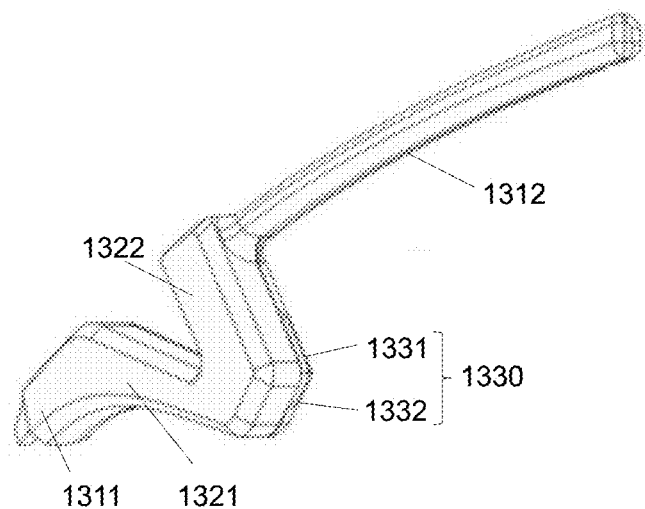
FIG. 14A is a schematic structural diagram illustrating a wearing component according to some embodiments of the present disclosure.
Figure 14B:
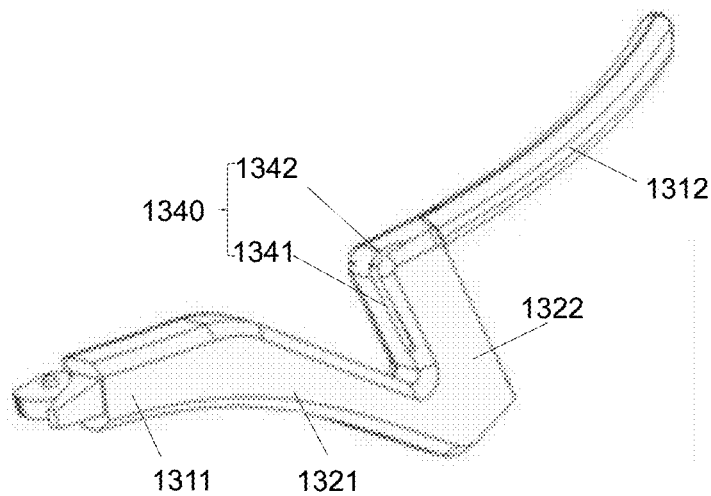
FIG. 14B is a schematic structural diagram illustrating a wearing component from another viewing angle according to some embodiments of the present disclosure.

FIG. 12 is a schematic structural diagram illustrating a sound-producing device according to some embodiments of the present disclosure. As shown in FIG. 12, the sound-producing device may include a wearing component 1210 and an acoustic unit 1220. The acoustic unit 1220 may be a cuboid structure. A side of the acoustic unit 1220 with a relatively small length may be connected with the wearing component 1210, and a side of the acoustic unit 1220 with a relatively large length may be connected with the wearing component 1210 at an angle, so the first sound guide hole at a lower right corner of the acoustic unit may be closer to the ear canal opening of the user, and the second sound guide hole at an upper left corner of the acoustic unit 1220 may face away from the ear canal opening. The acoustic unit 1220 and the wearing component 1210 may be arranged at an angle. When the user wears the sound-producing device, the first sound guide hole of the acoustic unit 1220 may be closer to the ear canal opening of the user. In some embodiments, an included angle θ between the side of the acoustic unit 1220 with a relatively large length and the wearing component 1210 may be 5°-85°. In some embodiments, an included angle θ may be 10°-70°. In some embodiments, an included angle θ may be 15°-60°. In some embodiments, an included angle θ may be 20°-45°. In some embodiments, an included angle θ may be 30°-90°. In some embodiments, the acoustic unit and the wearing component may be an integrated structure, and the acoustic unit may be located in the wearing component 1210. FIG. 13 is a schematic structural diagram illustrating a wearing component according to some embodiments of the present disclosure. FIG. 14A and FIG. 14B are schematic structural diagrams illustrating the wearing component in FIG. 13 from different viewing angles. Referring to FIG. 13, FIG. 14A and FIG. 14B, the wearing component 1300 may be provided with a concave segment 1320 and a connecting segment 1310 connected with the concave segment 1320. The concave segment 1320 may cause an upper edge of the wearing component 1300 to have a downward depression on the wearing component 1300. In this embodiment, since the concave segment 1320 is folded, the flexibility of the concave segment 1320 may be increased. The wearing component 1300 may adaptively deform according to the shape of the user's head due to the existence of the concave segment 1320, thus making the wearing component 1300 easier for the user to wear. In some embodiments, the concave segment 1320 may have an acoustic unit (not shown in FIG. 13). The concave segment 1320 may be used to install the acoustic unit and make the acoustic unit close to the ear of the user. The connecting segment 1310 may be used to connect the concave segment 1320 with a visual component of the sound-producing device and be erected on the auricle of the user. The concave segment 1320 may be connected with the connecting segment 1310 through a physical connection a bonding, an inlaying, a welding, a riveting, a screw connection, a snap connection, etc.

In some embodiments, the concave segment 1320 may cause the acoustic unit to be located in front of the ear of the user. As used herein, the front of the ear may be referred to as a side of the user's ear facing the user's face. For example, when the user wears the sound-producing device, the concave segment 1320 may be located on a side of the ear facing the user's eyes, so that the acoustic unit arranged on the concave segment 1320 may be closer to the ear canal opening of the user, and a sound signal emitted by the acoustic unit may be transmitted to the ear of the user more easily.

In some embodiments, the concave segment 1320 may be configured in any feasible shape. The shape of the concave segment 1320 may be understood as a shape of the structure of the concave segment 1320 or a concave shape of the concave segment 1320. Exemplary shapes of the concave segment 20 may include, but not limited to, a Y shape, a V shape, and a folded shape. Several exemplary concave segments will be described below.

The concave segment 1320 may include a transition part 1321 and a mounting part 1322 connected at an angle. The acoustic unit may be disposed in the mounting part 1322. When the wearing component is worn, the transition part 1321 and the connecting segment 1310 may be bent and connected and extend downward, so as to extend toward the ear canal opening of the user, to shorten the distance between the acoustic unit disposed therein and the ear canal opening. The transition part 1321 may refer to a part of the concave segment 1320 that is closer to the visual component. The mounting part 1322 may refer to a part of the concave segment 1320 that is closer to the ear of the user. In some embodiments, the transition part 1321 and the mounting part 1322 may have different shapes or the same shape. The mounting part 1322 and the transition part 1321 of the concave segment 1320 may be connected at any angle, thereby forming the concave segment 1320 of different shapes. Here, the connection between the mounting part 1322 and the transition part 1321 of the concave segment 1320 at any angle may mean that an included angle formed after the connection of the mounting part 1322 and the transition part 1321 may be any angle. In some embodiments, an included angle formed between the mounting part 1322 and the transition part 1321 may be within a range of 15-150 degrees. In some embodiments, the included angle formed between the mounting part 1322 and the transition part 1321 may be within a range of 30-150 degrees. In some embodiments, the included angle formed between the mounting part 1322 and the transition part 1321 may be within a range of 45-150 degrees. In some embodiments, the included angle formed between the mounting part 1322 and the transition part 1321 may be within a range of 60-150 degrees. In some embodiments, the included angle formed between the mounting part 1322 and the transition part 1321 may be within a range of 75-90 degrees. For example, the included angle formed between the mounting part 1322 and the transition part 1321 may be 30 degrees, 60 degrees, 90 degrees, or 120 degrees.

In some embodiments, the mounting part 1322 and the transition part 1321 may be connected in a detachable manner, such as a screw connection or a plug connection. In some embodiments, the connecting segment 1310 and the concave segment 1320 may be fixedly connected. For example, the connecting segment 1310 and the concave segment 1320 may be connected by welding, riveting, bonding, etc. In some embodiments, the mounting part 1322 and the transition part 1321 may also be directly connected, or connected through an adjusting structure. The adjusting structure may be a hinge, a spherical hinge, or a telescopic rod, etc. The adjusting structure may enable the mounting part 1322 to rotate or translate relative to the transition part 1321. In some embodiments, the mounting part 1322 and the transition part 1321 may also be an integrated structure.

As an exemplary illustration, in some embodiments, the concave segment 1320 may be V-shaped, i.e., the concave shape formed by the mounting part 1322 and the transition part 1321 may be V-shaped. One end of the mounting part 1322 may be connected with a part (e.g., a first connecting segment 1312) of the connecting segment 1310 away from the visual component, and the other end of the mounting part 1322 may extend downward. An included angle formed between the mounting part 1322 and the connecting segment 1310 may be approximately 90 degrees. One end of the transition part 1321 may be connected with a part (e.g., a second connecting segment 1311) of the connecting segment 1310 close to the visual component, and the other end of the transition part 1321 may extend toward the tragus of the user and be inclined at a certain angle relative to the connecting segment 1310. The mounting part 1322 and the transition part 1321 may be connected to form a downward V-shaped depression.

It should be noted that the foregoing one or more embodiments are for illustrative purposes only, and are not intended to limit the shape or quantity of the concave segments 1320. After fully understanding the principle of the concave segment 1320, variations may be made to the concave segment 1320 to obtain a concave segment 1320 different from that in the embodiment of the present disclosure. For example, the shapes of the mounting part 1322 and the transition part 1321 may be adjusted, so that the shape of the concave segment 1320 formed by the mounting part 1322 and the transition part 1321 may be U-shaped. In some embodiments, the wearing component 1300 may include a plurality of concave segments 1320 with different shapes. For example, the wearing component 1300 may include two concave segments 1320. One of the two concave segments 1320 may be a V-shaped structure, and the other concave segment 1320 may be a Y-shaped structure.

In some embodiments, the connecting segment 1310 may include a first connecting segment 1312 and a second connecting segment 1311. The concave segment 1320 may be connected between the first connecting segment 1312 and the second connecting segment 1311. The first connecting segment 1312 may be used to be erected on the auricle. The second connecting segment 1311 may be used to connect the visual component. In some embodiments, the second connecting segment 1311 may be connected to one end of the mounting part 1322 and extend away from the first connecting segment 1312 in a straight strip shape. The concave segment 1320 may extend downward relative to the first connecting segment 1312 and the second connecting segment 1311, to form a convex shape and a depression relative to the first connecting segment 1312 and the second connecting segment 1311.

In some application scenarios, when the wearing component 1300 is erected on the auricle of the user, the concave segment 1320 may be located at a side of the auricle facing the user's eyes, so that when the user wears the wearing component, the concave segment 1320 may extend toward the tragus, and the acoustic unit disposed in the concave segment 1320 may be close to the tragus to be closer to the external auditory canal of the user, thereby shortening the distance between the acoustic unit and the ear of the user, and making it easier to transmit sound to the user.

In some embodiments, the acoustic unit (not shown in the figure) may be located inside the mounting part 1322. The mounting part 1322 may be a hollow housing structure. The mounting part 1322 may be used as the housing of the acoustic unit. In some embodiments, the diaphragm and the magnetic circuit structure of the acoustic unit may be connected through the voice coil. The magnetic circuit structure may be connected with the mounting part 1322. A side of the diaphragm facing away from the magnetic circuit structure may be a front surface of the diaphragm, and the other side of the diaphragm may be a back surface of the diaphragm. The diaphragm may vibrate to radiate sound outwards from the front surface and the back surface of the diaphragm, respectively. In some embodiments, the mounting part 1322 and the diaphragm may form a first acoustic cavity for radiating sound. The first acoustic cavity and the first sound guide hole 1330 may be acoustically coupled. The first sound guide hole 1330 may be located at different side walls of the mounting part 1300 corresponding to the first acoustic cavity. Further, the first sound guide hole 1330 may be located at a side wall of the mounting part 1322 away from the transition part 1321. When the user wears the sound-producing device, the first sound guide hole 1330 may be close to the ear canal opening of the user. In some embodiments, the first sound guide hole 1330 may include a first hole part 1331 and a second hole part 1332. The first hole part 1331 may be located at a side wall of the mounting part 1322 away from the transition part 1321, and the second hole part 1332 may be located at a bottom side wall of the mounting part 1322. The first hole part 1331 and the second hole part 1332 may be connected.

In some embodiments, the acoustic unit may further include a second sound guide hole 1340. The second sound guide hole 1340 may be used to transport the sound produced from the back surface of the acoustic unit to the external environment. The second sound guide hole 1340 may be located at different side walls of the mounting part 1322 corresponding to the second acoustic cavity. The second sound guide hole 1340 and the second acoustic cavity may be acoustically coupled. In some embodiments, the second sound guide hole 1340 and the first sound guide hole 1330 may be arranged oppositely. As used herein, the opposite arrangement may be understood as that an opening orientation of the second sound guide hole 1340 and an opening orientation of the first sound guide hole 1330 may be opposite or approximately opposite. The second sound guide hole may include a third hole part 1341 and a fourth hole part 1342. The third hole part 1341 may be located at a side wall of the mounting part 1322 close to the transition part 1321, and the fourth hole part may be located at a top of the mounting part 1322. When the user wears the sound-producing device, the first hole part 1331 and the second hole part 1332 of the first sound guide hole 1330 may face the ear canal opening of the user, and the third hole part 1341 and the fourth hole part 1342 of the second sound guide hole 1340 may face away from the ear canal opening of the user. The sound output from the first sound guide hole 1330 and the sound output from the second sound guide hole 1340 may satisfy a specific condition (e.g., a phase difference may be about 180°) to form dipole-like radiation. In the far field, the sound output from the first sound guide hole 1330 and the sound output from the second sound guide hole 1340 may be reversely cancelled, thereby reducing the sound leakage volume of the acoustic unit in the far field and preventing the sound output from the acoustic unit being heard by people nearby.

It should be noted that the foregoing one or more embodiments are only for illustrative purposes, and are not intended to limit the positions of the first sound guide hole 1330 and the second sound guide hole 1340. After fully understanding the principle of the opposite arrangement of the first sound guide hole 1330 and the second sound guide hole 1340, variations may be made to the first sound guide hole 1330 and the second sound guide hole 1340 to obtain the first sound guide hole 1330 and the second sound guide hole 1340 different from those of the embodiments in the present disclosure. For example, the first sound guide hole 1330 or the second sound guide hole 1340 may be located at a side wall of the mounting part 1322 by adjusting the positions of the first sound guide hole 1330 and the second sound guide hole 1340. More descriptions regarding the first sound guide hole 1330 and the second sound guide hole 1340 may be found elsewhere in the present disclosure (e.g., FIG. 7(b) and related descriptions thereof).

Figure 15:
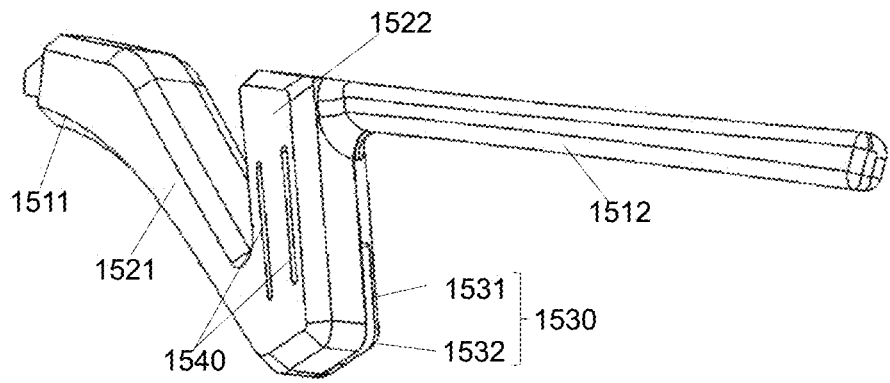
FIG. 15 is a schematic structural diagram illustrating a wearing component according to some embodiments of the present disclosure.

FIG. 15 is a schematic structural diagram illustrating a wearing component according to some embodiments of the present disclosure. The overall structure of a wearing component 1500 in FIG. 15 may be substantially the same as the overall structure of the wearing component 1300 in FIG. 13, FIG. 14A and FIG. 14B. A difference between the wearing component 1500 and the wearing component 1300 may be that a position of a second sound guide hole 1540 of the wearing component 1500 in FIG. 15 may be different from the position of the second sound guide hole 1340 of the wearing component 1300. A first connecting segment 1512, a second connecting segment 1511, a transition part 1521, a mounting part 1522, a first sound guide hole 1530, a first hole part 1531, and a second hole part 1532 in FIG. 15 may be respectively similar to the first connecting segment 1312, the second connecting segment 1311, the transition part 1321, the mounting part 1322, the first sound guide hole 1330, the first hole part 1331, and the second hole part 1332 in FIG. 14A and FIG. 14B. A magnetic circuit structure of an acoustic unit may include a magnetic conductive cover (not shown in FIG. 15). The magnetic conductive cover may be away from a diaphragm, and a portion of the magnetic conductive cover may be used as a side wall of the mounting part 1522. Here it can be understood that the magnetic conductive cover may be a side wall of the mounting part 1522. In some embodiments, the mounting part 1522 may include one or more second sound guide holes 1540. The second sound guide holes 1540 may be located on the magnetic conductive cover. Here, the first sound guide hole 1530 and the second sound guide hole 1540 of the acoustic unit may be approximately opposite. When the user wears the sound-producing device, the first sound guide hole 1530 may face the ear canal of the user, and the second sound guide hole 1540 may face away from the user's face. It should be noted that a number of the second sound guide holes 1540 may not be limited to two in FIG. 15, but may also be one, three, or four, etc. More descriptions regarding the first sound guide hole 1530 and the second sound guide hole 1540 may be found elsewhere in the present disclosure (e.g., FIG. 7(c) and related descriptions thereof).

Figure 16:
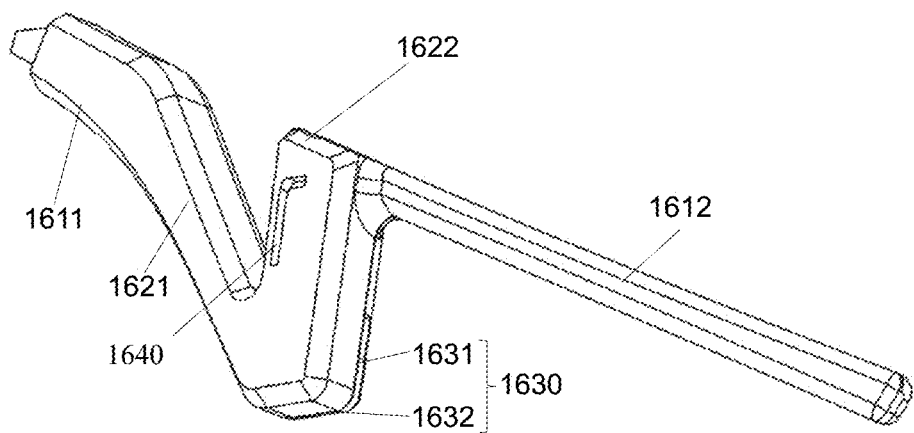
FIG. 16 is a schematic structural diagram illustrating another wearing component according to some embodiments of the present disclosure.

FIG. 16 is a schematic structural diagram illustrating another wearing component according to some embodiments of the present disclosure. The wearing component 1600 in FIG. 16 may be substantially the same as the wearing component 1300 in FIG. 13, FIG. 14A and FIG. 14B. A difference may be that a position of a second sound guide hole 1640 of the wearing component 1600 in FIG. 16 may be different. A first connecting segment 1612, a second connecting segment 1611, a transition part 1621, a mounting part 1622, a first sound guide hole 1630, a first hole part 1631, and a second hole part 1632 in FIG. 16 may be respectively similar to the first connecting segment 1312, the second connecting segment 1311, the transition part 1321, the mounting part 1322, the first sound guide hole 1330, the first hole part 1331, and the second hole part 1332 in FIG. 14A and FIG. 14B. As shown in FIG. 16, the second sound guide hole 1640 may be located on a side wall of the mounting part 1622 corresponding to a second acoustic cavity. When the user wears the sound-producing device, the first sound guide hole 1630 may face the ear canal of the user, and the second sound guide hole 1640 may face away from the user's face. More descriptions regarding the first sound guide hole 1630 and the second sound guide hole 1640 may be found elsewhere in the present disclosure (e.g., FIG. 7(d) and related descriptions thereof).

It should be understood that the schematic diagrams in FIG. 15 and FIG. 16 are provided for illustrative purposes only, and are not intended to limit the scope of the present disclosure. Those skilled in the art can make various variations and modifications under the guidance of the present disclosure. Such variations and modifications all fall within the scope of protection for the disclosure. In some embodiments, one or more features such as the shape, size, and position of each of the elements in the figure may be adjusted according to actual conditions.

In some embodiments, the resonance frequency corresponding to the formant of the acoustic unit may be reduced by reducing a volume of the second acoustic cavity, thereby improving the acoustic output effect of the acoustic unit. The shape or volume of the second acoustic cavity of the acoustic unit may be related to positions of components (e.g., the diaphragm, and the magnetic circuit structure) of the acoustic transducer in the housing. For example, the second acoustic cavity may be formed between the diaphragm and the housing, and the larger a distance between the diaphragm and a side wall of the housing facing the diaphragm is, the larger the volume of the second acoustic cavity may be. In some embodiments, the volume of the second acoustic cavity may be reduced by reducing the distance between the diaphragm and the housing. In some embodiments, the volume of the second acoustic cavity may also be reduced by adjusting the structure of the housing.

Figure 17:
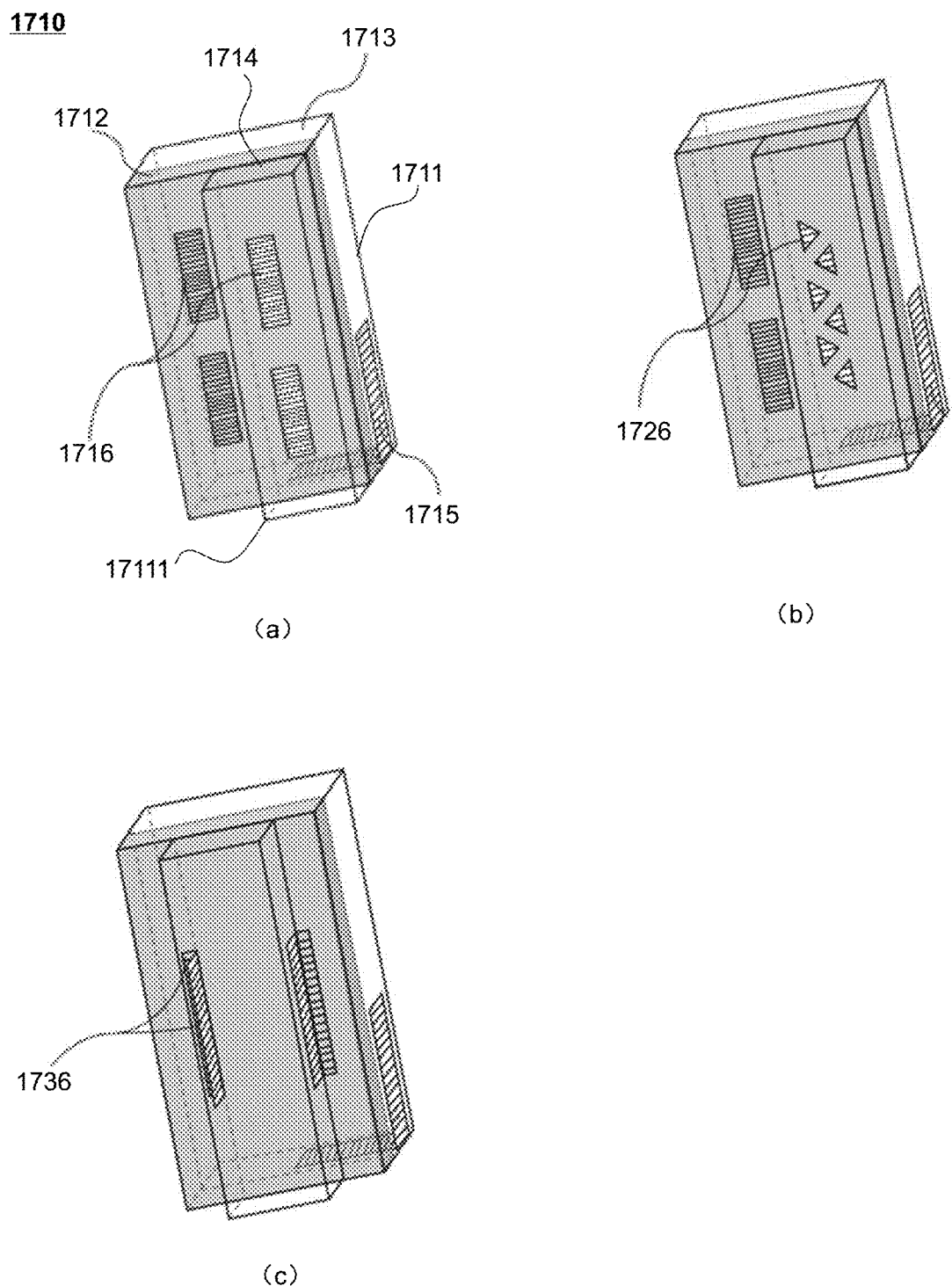
FIG. 17 is a schematic structural diagram illustrating acoustic units according to some embodiments of the present disclosure.

FIG. 17 is a schematic structural diagram illustrating different acoustic units according to some embodiments of the present disclosure. As shown in FIG. 17(a), an acoustic unit 1710 may include a housing 1711 and an acoustic transducer 1712. In some embodiments, the housing 1711 may be a hollow cuboid structure. The housing 1711 may include a convex part 17111 that protrudes outward relative to a side wall on a side of the housing. The acoustic transducer 1712 may be configured to convert a signal containing sound information into a sound signal. In some embodiments, the acoustic transducer 1712 may include a diaphragm and a magnetic circuit structure. The diaphragm and the magnetic circuit structure may be connected through a voice coil. The magnetic circuit structure may be connected with the housing 1711. An internal magnetic field of the magnetic circuit structure may change in response to the signal containing the sound (e.g., the electrical signal). The voice coil may vibrate under the action of the magnetic circuit structure. The diaphragm may vibrate in response to the vibration of the voice coil. The diaphragm may drive the air inside the housing 1711 to vibrate to produce sound waves. In some embodiments, a side of the diaphragm of the acoustic transducer 1712 facing away from the magnetic circuit structure may be a front surface of the diaphragm, and the other side of the diaphragm may be a back surface of the diaphragm. The diaphragm may vibrate to radiate sound from the front surface and the back surface of the diaphragm, respectively. In some embodiments, the housing 1711 and the front surface of the diaphragm may form a first acoustic cavity 1713 for radiating sound. A magnetic conductive cover of the magnetic circuit structure may be used as a complete side wall or a portion of a side wall of the housing 1711 where the convex part 17111 is located. The convex part 17111 may protrude outward relative to the magnetic conductive cover. A second acoustic cavity 1714 may be formed between the back surface of the diaphragm and the convex part 17111. In some embodiments, the acoustic unit 1710 may further include a first sound guide hole 1715. The first sound guide hole 1715 may be used to output the sound produced at the front surface of the diaphragm toward the ear canal opening of the user. The first sound guide hole 1715 and the first acoustic cavity 1713 may be acoustically coupled. Specifically, the first sound guide hole 1715 may be located on a side wall of the housing 1711 where the first acoustic cavity 1713 is located. In order to reduce the sound leakage of the acoustic unit 1710, in some embodiments, the acoustic unit 1710 may further include a second sound guide hole 1716. The second sound guide hole 1716 may be used to transmit the sound produced from the back surface of the diaphragm to the external environment. In some embodiments, the second sound guide hole 1716 may be located on the magnetic conductive cover. The second sound guide hole 1716 on the magnetic conductive cover may directly output the sound produced at the back surface of the diaphragm to the outside. In some embodiments, the second sound guide hole 1716 may also be located on a side wall of the convex part 17111 corresponding to the second acoustic cavity 1714. The sound produced at the back surface of the diaphragm may be transmitted into the second acoustic cavity 1714 through a hole (not shown in the FIG. 17) on the magnetic conductive cover, and then transmitted to the external environment through the second sound guide hole 1716 disposed on the convex part 17111. In some embodiments, shapes and a number of the second sound guide holes on the magnetic conductive cover and shapes and a number of the second sound guide holes on the convex part 17111 may be the same. In some embodiments, the shape of the second sound guide hole 1716 may include a rectangle, a circle, a semicircle, an ellipse, a pentagon, a triangle, or other regular or irregular shapes. In some embodiments, the shapes and the number of the second sound guide holes on the magnetic conductive cover and the shapes and the number of the second sound guide holes on the convex part may also be different. For example, in FIG. 17(*b*), the second sound guide hole 1726 on the magnetic conductive cover may be a rectangle, and the shape of the second sound guide hole 1726 on the convex part may be a triangle. In some embodiments, an orientation of the second sound guide hole on the magnetic conductive cover and an orientation of the second sound guide hole on the convex part may be the same or different. For example, in FIG. 17(*a*) and FIG. 17(*b*), when side walls of the magnetic conductive cover and the convex part where the second sound guide holes are located are opposite to the diaphragm of the acoustic transducer unit, the orientation of the second sound guide hole on the magnetic conductive cover and the orientation of the second sound guide hole on the convex part may be the same. As another example, in FIG. 17(*c*), the orientation of the second sound guide hole 1736 on the magnetic conductive cover and the orientation of the second sound guide hole 1736 on the convex part may be different. It should be noted that the second sound guide holes (e.g., the second sound guide hole 1716, the second sound guide hole 1726, and the second sound guide hole 1736) in the above-mentioned embodiments are only for illustrative purposes only, and the position, quantity, dimension, shape, etc. of each of the second sound guide holes may be adjusted according to the actual application scenarios, as long as the first sound guide hole and the second sound guide hole may be arranged oppositely or the sound output from the first sound guide hole and the sound output from the second sound guide hole may be approximately opposite, which fall within the protection scope of the present disclosure.

It should be noted that different embodiments may have different beneficial effects. In different embodiments, the possible beneficial effects may be any one or a combination of the above, or any other possible beneficial effects.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. In addition, some features, structures, or features in the present disclosure of one or more embodiments may be appropriately combined. Characteristics of one or more embodiments of the present disclosure may be properly combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A sound-producing device, comprising:
   a diaphragm; and
   a housing, wherein the housing includes a first sound guide hole and a second sound guide hole, the diaphragm is disposed in the housing, and the first sound guide hole and the second sound guide hole are respectively located on both sides of the diaphragm;
   when a user wears the sound-producing device, a distance between the first sound guide hole and an ear canal opening of the user is smaller than a distance between the diaphragm and the ear canal opening of the user, an included angle between a connection line between the first sound guide hole and the second sound guide hole and a connection line between the center of mass of the diaphragm and the ear canal opening of the user is smaller than 45°, and a distance between the second sound guide hole and the ear canal opening of the user is greater than the distance between the diaphragm and the ear canal opening of the user.

2. The sound-producing device of claim 1, wherein the distance between the first sound guide hole and the ear canal opening of the user is 0.5 cm-2.5 cm.

3. The sound-producing device of claim 1, wherein the distance between the second sound guide hole and the ear canal opening of the user is 1.5 cm-5 cm.

4. The sound-producing device of claim 1, wherein the distance between the diaphragm and the ear canal opening of the user is 1.5 cm-3 cm.

5. The sound-producing device of claim 1, wherein a ratio of the distance between the diaphragm and the ear canal opening of the user to the distance between the first sound guide hole and the ear canal opening of the user is 1.4-3.

6. The sound-producing device of claim 1, wherein a ratio of the distance between the second sound guide hole and the ear canal opening of the user to the distance between the first sound guide hole and the ear canal opening of the user is 1.4-5.

7. The sound-producing device of claim 1, wherein the housing and the diaphragm form a first acoustic cavity for radiating sound, the first acoustic cavity and the first sound guide hole are acoustically coupled, the first sound guide hole includes a first hole part and a second hole part, the first hole part and the second hole part are connected, and the first hole part and the second hole part are located at different side walls of the housing corresponding to the first acoustic cavity.

8. The sound-producing device of claim 7, wherein a length of the side wall where the first hole part is located is greater than a length of the side wall where the second hole part is located.

9. The sound-producing device of claim 8, wherein a ratio of a length of the second hole part to the length of the side wall where the second hole part is located is ⅙-⅔.

10. The sound-producing device of claim 1, further comprising a magnetic circuit structure, wherein the magnetic circuit structure is connected with the housing, the diaphragm is connected with the magnetic circuit structure through a voice coil, the housing and the magnetic circuit structure form a second acoustic cavity for radiating sound, the second acoustic cavity and the second sound guide hole are acoustically coupled, and the second sound guide hole is located on a side wall corresponding to the second acoustic cavity.

11. The sound-producing device of claim 10, wherein the magnetic circuit structure of the sound-producing device includes a magnetic conductive cover, the magnetic conductive cover faces away from the diaphragm, a portion of the magnetic conductive cover is used as a side wall of the housing, and the second sound guide hole is located on the magnetic conductive cover.

12. The sound-producing device of claim 1, wherein a ratio of a difference between an effective area of the second sound guide hole and an effective area of the first sound guide hole to the effective area of the first sound guide hole or the effective area of the second sound guide hole is smaller than or equal to 40%.

13. The sound-producing device of claim 1, comprising a wearing component, wherein the wearing component includes a connecting segment and a concave segment connected with the connecting segment, the concave segment causes an upper edge of the wearing component to have a downward depression on the wearing component, and the housing is connected with the concave segment.

14. The sound-producing device of claim 13, wherein the concave segment is configured to cause the concave segment close to an ear of the user when the user wears the wearing component, and the concave segment enables the first sound guide hole to be located near the ear of the user.

15. The sound-producing device of claim 14, wherein the concave segment includes a mounting part and a transition part connected at an angle, the housing is arranged on the mounting part or the transition part, and the transition part and the mounting part are bent and connected with the connecting segment and extend downwards.

16. The sound-producing device of claim 15, wherein the angle is 15°-150°.

17. The sound-producing device of claim 15, wherein the connecting segment includes a first connecting segment, the transition part is connected between the mounting part and the first connecting segment, and the transition part is bent and connected with the first connecting segment and extends downwards.

18. The sound-producing device of claim 17, wherein the connecting segment further includes a second connecting segment, and the second connecting segment is connected to one end of the mounting part.

19. The sound-producing device of claim 13, wherein the first sound guide hole is disposed in at least one of an inner side of the concave segment facing the head of the user, an edge of the concave segment facing a tragus of the user, or a side surface of the concave segment facing the tragus of the user.

20. The sound-producing device of claim 13, wherein the wearing component includes a left ear wearing part and a right ear wearing part which are respectively used to be erected on the left and right ears of the user.

* * * * *